(12) United States Patent
Hoover et al.

(10) Patent No.: US 11,282,015 B2
(45) Date of Patent: Mar. 22, 2022

(54) METHOD AND SYSTEM FOR ELECTRONICALLY MONITORING AND RECORDING A PROCESS IN A CLEAN SPACE

(71) Applicant: CENTRE FOR COMMERCIALIZATION OF REGENERATIVE MEDICINE, Toronto (CA)

(72) Inventors: Spencer W. Hoover, Toronto (CA); Aaron Dulgar-Tulloch, Toronto (CA); Scott Genin, Ontario (CA); Nicholas Timmins, Scarborough (CA); Steven Keizer, Toronto (CA); Aron Sankar, Toronto (CA); Howard Kim, Toronto (CA)

(73) Assignee: CENTRE FOR COMMERCIALIZATION OF REGENERATIVE MEDICINE, Toronto (CA)

( * ) Notice: Subject to any disclaimer, the term of this patent is extended or adjusted under 35 U.S.C. 154(b) by 69 days.

(21) Appl. No.: 16/487,184

(22) PCT Filed: Feb. 21, 2018

(86) PCT No.: PCT/CA2018/050197
§ 371 (c)(1),
(2) Date: Aug. 20, 2019

(87) PCT Pub. No.: WO2018/152629
PCT Pub. Date: Aug. 30, 2018

(65) Prior Publication Data
US 2021/0142235 A1 May 13, 2021

Related U.S. Application Data

(60) Provisional application No. 62/461,517, filed on Feb. 21, 2017.

(51) Int. Cl.
*G06Q 10/06* (2012.01)
*G06Q 50/04* (2012.01)

(52) U.S. Cl.
CPC .................. *G06Q 10/0633* (2013.01); *G06Q 10/06395* (2013.01); *G06Q 50/04* (2013.01)

(58) Field of Classification Search
CPC .......................................... G06Q 10/00–50/00
(Continued)

(56) References Cited

U.S. PATENT DOCUMENTS

| 4,815,014 A * | 3/1989 | Lipner | .................... G06F 3/033 702/184 |
| 7,899,562 B2 * | 3/2011 | Pannese | ................ G06T 7/0004 700/48 |

(Continued)

OTHER PUBLICATIONS

Written Opinion and International Search Report dated May 25, 2018 in connection with PCT/CA2018/050197, 8 pgs.

*Primary Examiner* — Alan S Miller
(74) *Attorney, Agent, or Firm* — Bereskin & Parr LLP; Carmela De Luca

(57) ABSTRACT

A method for monitoring and recording a process in a clean space and a system for implementing same are provided. The method involves providing an electronic process record to a user using at least one processor; monitoring, using at least one sensor, for an event associated with the electronic process record; detecting, using the at least one sensor, the event associated with the electronic process record; recording in at least one data storage, using the at least one processor, information associated with the detected event, the recorded information being associated with a record of the electronic process record in the at least one data storage; verifying, using the at least one processor in communication with the at least one data storage, the recorded information; and storing in the at least one data storage, using the at least one processor, an indication that the recorded information has been verified.

18 Claims, 8 Drawing Sheets

(58) Field of Classification Search
USPC ............................................... 705/7.11–7.42
See application file for complete search history.

(56) References Cited

U.S. PATENT DOCUMENTS

| | | | | |
|---|---|---|---|---|
| 8,219,548 | B2* | 7/2012 | Mizoe | G06Q 10/06 707/721 |
| 8,977,424 | B2* | 3/2015 | Ishimaru | G07C 5/0816 701/31.4 |
| 9,671,798 | B2* | 6/2017 | Hodge | G05B 19/41865 |
| 9,786,197 | B2* | 10/2017 | Asenjo | G09B 19/18 |
| 2007/0270980 | A1* | 11/2007 | Lipner | G05B 19/41875 700/19 |
| 2008/0133973 | A1* | 6/2008 | Mizoe | G06Q 10/06 714/37 |
| 2008/0155447 | A1* | 6/2008 | Pannese | H01L 21/67161 715/772 |
| 2013/0274929 | A1* | 10/2013 | Hodge | G05B 15/02 700/277 |
| 2014/0335480 | A1* | 11/2014 | Asenjo | G06Q 10/06 434/107 |
| 2015/0050950 | A1* | 2/2015 | Alon | H04W 4/02 455/456.1 |
| 2019/0220583 | A1* | 7/2019 | Douglas | G06F 21/316 |
| 2019/0370364 | A1* | 12/2019 | Casatelli | G06Q 40/08 |
| 2021/0019686 | A1* | 1/2021 | Kidd | G06F 16/248 |
| 2021/0034034 | A1* | 2/2021 | Cook | G05B 19/0428 |

* cited by examiner

Preparation

- Patient material received, tagged, inventoried and stored.
- Manufacturing campaign scheduled and electronic batch production record (eBPR) generated
- Bill of Materials (BOM) assigned; consumables and reagents are affixed with a unique identifier (e.g. RFID tag) containing pertinent information about the specific item (product code, lot number, expiry date, etc).

Manufacturing

- Operator verified for correct room and process assignment, and up-to-date training record
- Materials entering manufacturing space are detected by sensor and verified against BOM; visual display confirms item list and alerts operator of any deviations (e.g. missing or extra items, incorrect lot number, expired material).
- Visual display in clean room provides operator with 'ready to proceed' signal once all prerequisites are confirmed (e.g. materials in room, proper training, all equipment fit for use, etc)
- Operator performs operations per eBPR including T cell isolation and activation, gene transfer, expansion in bioreactor, harvest, volume reduction, wash, formulation, and cryopreservation
  - Operator is aided by visual display for current step instruction
  - Operator inputs process values into eBPR via voice command; entries are displayed on visually accessible display and operator confirms entry. Where required, second verifier confirms accuracy and completeness of entry.
  - Recording of consumables/reagents to specific process step in eBPR is optionally performed via sensor (scan or proximity-based)
  - Where process equipment is networked, process values or results can be directly recorded to eBPR
  - Where instructions are dependent on in-process results, eBPR instructions are automatically updated
    - e.g. mathematical calculations for dilution volumes based on in-process cell counts
    - e.g. decision to extend culture duration based on not reaching minimum cell number target
- Final product and QC samples tagged
- Quality control performs final release testing and updates eBPR
- eBPR reviewed and product released
- Batch data available for performance monitoring and analytical interrogation

Figure 8

METHOD AND SYSTEM FOR ELECTRONICALLY MONITORING AND RECORDING A PROCESS IN A CLEAN SPACE

CROSS REFERENCE TO PRIOR APPLICATIONS

This application represents the national stage entry of PCT International Application No. PCT/CA2018/05019, filed Feb. 21, 2018, which claims the benefit of priority to U.S. Provisional Patent Application Ser. No. 62/461,517, filed Feb. 21, 2017, both of which are incorporated herein by reference as if set forth in their entirety for all purposes.

FIELD OF THE DESCRIPTION

The present description relates generally to methods and systems for monitoring and recording a process. More specifically, the present description relates to methods and systems for electronically recording and monitoring a process that is carried out in a clean space.

BACKGROUND OF THE DESCRIPTION

In the processes of biotechnological and pharmaceutical development and production, processes are followed and records of observations and completion of one or more steps in the process are maintained. In some cases, such activities may be performed in accordance with guidance or rules set forth by a company and/or in accordance with laws and/or guidelines provided by a regulatory agency (e.g., the U.S. Federal Drug Administration "FDA").

For example, the current Good Manufacturing Practices (cGMPs) are a set of regulations utilized to enforce sound operational practices in the manufacture of goods, or the provision of services in industries such as foods, cosmetics, and pharmaceuticals. For example, for the manufacture of batch drug products, cGMP requires that batch processes must be documented, documented processes must be followed, and records indicating execution of the processes must be generated and retained in such a way that they can be easily retrieved, understood, and are representative of the processes and observations supporting the manufacture of a drug product. A specific type of record that may be required for cGMP manufacturing is a batch production record (BPR), which is a detailed written or electronic (eBPR) set of instructions meant to achieve uniformity and an audit trail of performance of a specific task, as defined by the specific marketing authorities such as the United States Code of Federal Regulations (CFR) Title 21 Parts 210 and 211 and the international quality standards (ISO) such as the International Council for Harmonization (ICH) Q7. Such records may include, for example, information relating to user identity, material, consumable usage, material yield, equipment usage, equipment validation, quality, process parameters, observations, and/or actions performed on batches.

Typically, paper BPRs have been used to document batch processes. For example, a paper copy of the master batch production record might be held in a secure area accessible by one quality assurance (QA) worker. When a production run is scheduled, the QA worker issues a copy of the BPR, by signing and dating the copy, entering the batch number, and then releasing the issued copy to an operator to perform. The operator then begins performing the BPR.

An alternative to paper BPRs are electronic BPRs (eB-PRs). Typically, an eBPR master copy is stored on a limited-access server. In operation, a QA worker permitted access to the server, will upload the eBPR onto a specific computer, and electronically sign, date and discharge the copy to a specific operator. The operator may then begin performing the process according to the eBPR and entering data electronically as required by the eBPR.

According to the FDA, data in a BPR should meet ALCOA (attributable, legible, contemporaneous, original, accurate) quality standards, whether it's recorded on paper or electronically.

A paper BPR may be sufficient in terms of attributability (e.g., traceable to the user performing the batch process and the date the data was recorded), contemporaneousness (e.g., documented in real-time and dated with the current date; no predating or postdating), and originality (i.e., the paper BPR is the earliest record; if corrections or revisions need to be made, changes shouldn't obscure prior entries). However, paper batch records may be susceptible to poor legibility, which may increase the likelihood of transcription errors. Accuracy may also be an issue with paper BPRs, at least because the data entries are susceptible to human error. It may be challenging and/or costly to secure and retain paper BPRs per company, regulatory and/or legal requirements. It may also be challenging to search paper BPRs for specific events or information.

Electronic BPRs may be advantageous relative to paper BPRs, at least because legibility is improved, which may also result in improved accuracy. Retention of eBPRs may be less challenging and more cost effective relative to paper BPRs. Further, searching eBPRs for specific events or information may be improved relative to paper BPRs.

Documenting processes carried out under sterile conditions, in which operators are required to wear protective gear, work in a sterile space (e.g., a biosafety cabinet or "BSC"), etc. present additional challenges to record keeping. For example, contemporaneous and original record keeping becomes challenging, if not impossible, because it would require a user operating in a BSC to exit the BSC and remove protective gear in order to make a data entry before continuing on with the process. In practice, in order to reduce contamination risk and eliminate time taking off and putting on gloves, it is common to have a second person observe a first person carrying out the process, the second person entering into the paper- or eBPR data associated with the process being carried out by the first person. This second person may be in addition to a person whose task it is to verify the data entered into the BPR. These practices are costly and may not meet the contemporaneous and or original requirements of ALCOA quality standards.

It is desirable to obviate or mitigate one or more of the above deficiencies.

SUMMARY OF THE DESCRIPTION

In a first aspect, a computer-implemented method for monitoring and recording a process in a clean space is provided. The method comprises: providing an electronic process record to a user using at least one processor; monitoring, using at least one sensor, for an event associated with the electronic process record; detecting, using the at least one sensor, the event associated with the electronic process record; and recording in at least one data storage, using the at least one processor, information associated with the detected event, the recorded information being associated with a record of the electronic process record in the at least one data storage.

In an embodiment of the method, the method further comprises verifying, using the at least one processor in communication with the at least one data storage, the recorded information; and storing in the at least one data storage, using the at least one processor, an indication that the recorded information has been verified.

In an embodiment of the method, the method further comprises: authenticating a user of the clean space, using the at least one sensor in communication with the at least one processor in communication with the at least one data storage.

In an embodiment of the method, the user is a human. In an embodiment of the method, the user is a machine.

In an embodiment of the method, more than one user participates in the process, and each user performs some or all of the monitoring, detecting, recording, verifying and/or storing according to the electronic process record provided to that user. In an embodiment, the more than one user is more than one human. In an embodiment, the user is at least one human and at least one machine.

In an embodiment of the method, the electronic process record is provided to the human via a display. In an embodiment, the display is adapted for operation associated with the clean space. In an embodiment, the display is positioned at a location that is outside the clean space and viewable by the user. In an embodiment, the display is adapted for operation in the clean space.

In an embodiment of the method, the process is associated with operation of a biotechnological or pharmaceutical manufacturing facility.

In an embodiment of the method, the process is associated with production of a cell therapy product or a gene therapy product.

In an embodiment of the method, one or more of the providing, monitoring, detecting, recording or verifying is computer-implemented.

In an embodiment of the method, the recording is a real-time or substantially real-time recording.

In an embodiment, the verifying occurs outside the clean space.

In an embodiment of the method, the verifying further comprises corroborating the verified recorded information. In an embodiment, the corroborating is computer-implemented.

In an embodiment of the method, when the recorded information associated with the electronic process record is outside a specification set out in the electronic process record the user or a recipient is notified. In an embodiment, the computer-implemented method of claim 18, further comprising providing the user with a corrective action for implementing process controls to correct the event. In an embodiment, the corrective action is provided to the user with user or recipient intervention. In an embodiment, the corrective action is provided to the user without user or recipient intervention. In an embodiment, the recipient is positioned at a location outside the clean space.

In a second aspect, a system for electronically monitoring and recording a process in a clean space is provided. The system comprises: a sensor, the sensor adapted for operation in the clean space; a data storage comprising one or more catalogues of information associated with the process; and a processor, the processor in communication with the sensor, and the data storage.

In an embodiment of the system, the information comprises data associated with one or more of: user identity, user authorization, one or more process records, and one or more events.

In an embodiment of the system, the system further comprises a display adapted for operation associated with the clean space. In an embodiment, the display is positioned at a location that is outside the clean space and viewable by the user.

In an embodiment of the system, the system further comprises a display adapted for operation in the clean space.

In an embodiment of the system, the process is associated with operation of a biotechnological or pharmaceutical manufacturing facility.

In an embodiment of the system, the process is associated with production of a cell therapy product or a gene therapy product.

In an embodiment of the system, the system further comprises one or more devices for implementation of one or more process controls.

In an embodiment of the system, the processor processes information associated with an event in the process that is outside a specification set out in the electronic process record and notifies a user or recipient. In an embodiment, the recipient is positioned inside the clean space. In an embodiment, the recipient is positioned outside the clean space.

In a third aspect, a non-transitory computer-readable storage medium storing instructions for monitoring and recording a process in a clean space is provided. The instructions comprise: providing an electronic process record to a user using at least one processor; monitoring, using at least one sensor, for an event associated with the electronic process record; detecting, using the at least one sensor, the event associated with the electronic process record; and recording in at least one data storage, using the at least one processor, information associated with the detected event, the recorded information being associated with a record of the electronic process record in the at least one data storage.

In an embodiment of the non-transitory computer-readable storage medium, the instructions further comprise verifying, using the at least one processor in communication with the at least one data storage, the recorded information; and storing in the at least one data storage, using the at least one processor, an indication that the recorded information has been verified.

In an embodiment of the non-transitory computer-readable storage medium, the instructions further comprise authenticating the user of the clean space, using the at least one sensor in communication with the at least one processor in communication with the at least one data storage, wherein the authenticating occurs prior to providing the electronic process record to the display.

In various embodiments of the non-transitory computer-readable storage medium, the user is a human or a machine.

In an embodiment of the non-transitory computer-readable storage medium, more than one user participates in the process, and each user performs some or all of the monitoring, detecting, recording, verifying and/or storing according to the electronic process record provided to that user. In an embodiment, the user is at least one human and at least one machine.

In an embodiment of the non-transitory computer-readable storage medium, the electronic process record is provided to the human via a display. In an embodiment, the display is adapted for operation associated with the clean space. In an embodiment, the display is positioned at a location that is outside the clean space and viewable by the user. In an embodiment, the display is adapted for operation in the clean space.

In an embodiment of the non-transitory computer-readable storage medium, the process is associated with operation of a biotechnological or pharmaceutical manufacturing facility.

In an embodiment of the non-transitory computer-readable storage medium, the process is associated with production of a cell therapy product or a gene therapy product.

In an embodiment of the non-transitory computer-readable storage medium, one or more of the providing, monitoring, detecting, recording or verifying is computer-implemented.

In an embodiment of the of the non-transitory computer-readable storage medium, the recording is a real-time or substantially real-time recording.

In an embodiment of the non-transitory computer-readable storage medium, the verifying occurs outside the clean space.

In an embodiment of the non-transitory computer-readable storage medium, the verifying further comprises corroborating the verified recorded information. In an embodiment, the corroborating is computer-implemented.

In an embodiment of the non-transitory computer-readable storage medium, when the recorded information associated with the electronic process record is outside a specification set out in the electronic process record the user or a recipient is notified. In an embodiment, the computer-implemented method of claim 18, further comprising providing the user with a corrective action for implementing process controls to correct the event. In an embodiment, the corrective action is provided to the user with user or recipient intervention. In an embodiment, the corrective action is provided to the user without user or recipient intervention. In an embodiment, the recipient is positioned at a location outside the clean space.

BRIEF DESCRIPTION OF THE DRAWINGS

The features of the invention will become more apparent in the following detailed description in which reference is made to the appended drawings wherein:

FIG. 8 depicts a flow chart illustrating one embodiment of a method, as provided herein.

DETAILED DESCRIPTION OF NON-LIMITING EXEMPLARY EMBODIMENTS

Figure 1:
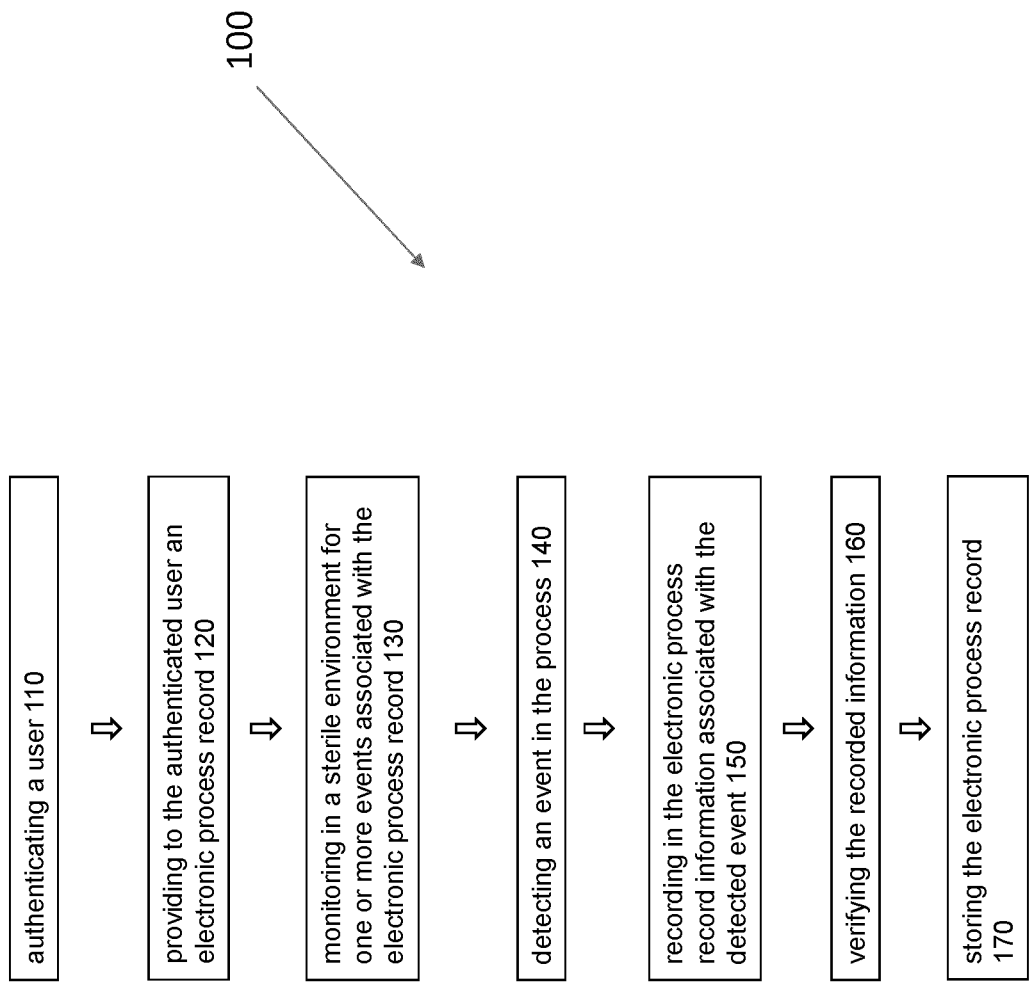
FIG. 1 depicts a flow chart illustrating one embodiment of a method provided herein.

Unless defined otherwise, all technical and scientific terms used herein generally have the same meaning as commonly understood by one of ordinary skill in the art to which this invention belongs.

Existing methods and systems for monitoring and recoding processes are not designed for use and/or implementation in a clean space. As used herein, "clean space" refers to a defined space, such as, for example, a cabinet, aseptic contaminant isolator, laminar air flow hood, or cleanroom, having conditions desirable and/or required for reducing the chance of contamination to one or more products during a process. For example, a clean space may be a defined sterile space, such as a biosafety cabinet. For example, existing methods and systems typically require manual entry of data and human observation of events in a process, one or both of which are susceptible to error and/or not desirable in a process carried out in a clean space, at least due to the increased risk of contamination, such as, for example, when a user exits a biosafety cabinet, de-gloves, manually enters data, re-gloves and re-enters the biosafety cabinet to continue on in the process.

In some cases, to reduce the risk of contamination in the clean space, two operators may be engaged to perform and record a process rather than one. For example, two operators may put on appropriate protective gear (e.g., gown-up), enter the clean space, sign in (e.g., with pen and paper, swipe card or keyboard password entry), then one of the operators (first person) carries out the process while the other operator (second person) enters into the process record (paper or electronic) information regarding the process, such as, for example, entering data (e.g., values) associated with a step or sub-step. Further, one or more steps in the process record may require verification by the operator (first person). If a second person is entering and/or verifying data generated by the operator (first person), the process is not compliant with the ALCOA principles, specifically the attributable and the contemporaneous principles. Further, one or more steps may require additional verification (corroboration) by another, such as a QA worker (third person). Having a third person on site in the clean space may further increase the risk of contamination and/or increase costs of the process.

The drawbacks to existing methods and systems for monitoring and recording processes are amplified in fields such as cell manufacturing, in which contamination is product-destroying and the cost per batch may be tens of thousands to millions of dollars. A method and/or system for monitoring and recording a cell manufacturing process that may reduce the risk of product contamination relative to existing methods and systems is desirable.

The present description generally relates to methods and systems for electronic monitoring and recording of a process that is carried out in a clean space. In various embodiments, the method and system facilitate hands-free operation, which may be desirable in clean space process. In various embodiments, the method and system facilitate real-time monitoring and recording of a process, or parts thereof, which may be desirable from a compliance perspective, e.g., by tending to facilitate contemporaneous recording and possibly reducing the need for another operator (second person) for the recording of a process, or parts thereof.

In a first aspect, the present description generally relates to a computer-implemented method for electronically monitoring and recording a process carried out in a clean space.

In some embodiments, the disclosed method is suitable for one or more of the following: real-time recording of a process (or substantially real-time); hands-free monitoring and recording of a process; enforcing sequential execution of steps in a process; providing a user with real-time feedback regarding verified execution of events in a process; generating an audit trail of events and information associated with a process that has been carried out in a clean space; controlling user access to electronic process records; enforcing controlled editing of an electronic process record; complying with ALCOA principles for data storage and management; documenting changes and/or deviations to an electronic process record; integration with various instrumentation systems associated with a process; reducing risk of contamination; and enabling identification of trends and out of trend results (e.g., Process Analytics Technology or "PAT").

In some embodiments, the disclosed methods and systems are suitable for monitoring, recording, documenting and/or integrating processes associated with the operation of a biotechnological or pharmaceutical manufacturing facility; for example, for the production of a cell therapy product or a gene therapy product. These processes, each of which may include a single step or a series of one or more steps, may include, for example: cleaning and sterilization; shipping, receiving, and storing materials; gowning by people entering the clean space; performing one or more steps in a manufacturing protocol; analyzing a manufactured product; performing a fill-finish operation; transferring materials between sterile environments; carrying out in process quality investigations; responding to emergencies; and other processes known to those skilled in the art. In a preferred embodiment, the process directs the manufacturing workflow (process) of a cell therapy, such as, for example, a generic patient-specific T-cell therapy, such as CAR T-cell therapy. The process may direct the entire workflow, from creating a bill of materials to releasing the final therapeutic product, or only a portion of the workflow (process).

Each step in various embodiments of the disclosed invention is discussed in further detail below.

For simplicity, some embodiments of the method are shown (FIG. 1) and described herein as a series of blocks. It is to be understood that the method is not limited by the order of the blocks in the figures provided herein. In some embodiments, some blocks may occur in different orders and/or concurrently with other blocks relative to the order shown and described. In some embodiments, fewer than all the illustrated blocks may be required to implement the disclosed method. In some embodiments, one or more blocks may be combined or separated into multiple blocks. In some embodiments, additional (non-illustrated blocks) may be added to the flow of the disclosed method. In some embodiments, one or more blocks may be repeated to implement the disclosed method. In some embodiments, a series of blocks may be repeated one or more times to implement the disclosed method.

FIG. 1 depicts one embodiment of a method 100 for monitoring and recording a process in a clean space, as provided herein.

Method 100 optionally includes, at 110, authenticating a user. As used herein, "user" refers to a human or machine (e.g., robot, drone or a piece of equipment in the clean space such as a conveyor belt, a water bath, a bioreactor, an incubator, a microscope or a camera) associated with carrying out one or more steps in the process. The user may be, for example, an operator who is pre-authorized to access and carry out the process in the clean space. Authenticating the user may involve, for example, confirmation of a username and password, a user RFID tag, a user barcode, or biometric identification (e.g., voice identification, retinal scan, fingerprint scan, face scan, etc.). In an embodiment the user is a human and a machine. For, example, the human may perform one or more steps of the process and the machine may perform other of the steps of the process. A user who has completed authentication may be referred to as an "authenticated user". In an embodiment, the user is an authenticated user. Preferably, the user is authenticated prior to the user performing any steps in the process. In another embodiment, the user is authenticated prior to receiving the electronic process record.

Preferably, authentication is a computer-implemented step, in which a user's identification is authenticated, using a processor, by comparison to user information maintained in a data storage. In some embodiments, only a pre-authorized user may be authenticated. In an embodiment, authentication is a hands-free authentication, meaning that a user need not touch a data-entry device (e.g., a keyboard, touch display, pen and paper, etc.) in order to authenticate the user. Hands-free computer-implemented authentication, such as by voice, retina, RFID, or barcode scan, and comparison and, optionally, verification of the scanned data, by a processor, with user information maintained in a data storage 230, is expected to facilitate compliance with ALCOA principles by reducing the potential for contamination which may result from de-gloving or de-gowning to otherwise enter authentication information.

Method 100 also includes, at 120, providing to the authenticated user an electronic process record. The electronic process record may be, for example, a standard operating procedure (SOP) or an electronic batch production record (eBPR), which requires execution in a clean space. The electronic process record may relate to one or more procedures to be carried out in the event that an emergency arises resulting in the clean space needing to be evacuated before a process is completed. The procedures may provide the user with steps to take to stop the process such that the process can be resumed once the emergency has passed. In an embodiment, the steps to be taken allow the process to be resumed after the emergency without compromising the process or any reagents or products involved in the process. In an embodiment, the electronic process record relates to steps to be taken by a user to safely exit the clean space. The electronic process record may include, for example, steps and sub-steps in the process and data fields in which features of a step and/or sub-step are to be documented and/or verified.

Preferably, provision of the electronic process record is a computer-implemented step. In an embodiment, the provision 120 of the electronic process record is a hands-free provision, using a processor 220, meaning that a user need not touch a data-entry device (e.g., a keyboard, touch display, pen and paper, etc.) in order to obtain the electronic process record. Providing the process record may involve, for example, obtaining, using a processor, a copy of the record that is compliant with the GMP standard (which requires that copies be "true" copies) from a data storage and displaying, using a display, the record, or a portion thereof, in a location that is easily viewed by the user during operation of the process. In some embodiments, the process record may be provided via a display located in the clean space. In some embodiments, the process record may be provided via a display located outside the clean space, such as, for example, in a vicinity that is close to a BSC and within view of the user of the BSC.

In some preferred embodiments, only a single step or sub-step of a process is provided to the authenticated user at a time. This may be advantageous at least because it ensures that the sequence in which steps, sub-steps, etc. are carried out aligns with the sequence set forth in the process record.

Method 100 also includes, at 130, monitoring for one or more events in a process associated with the electronic process record. The one or more events may be, for example, features of steps or sub-steps in the process which require information recording. For example, an event may be:

movement of hands in and out of a BSC, transfer of liquid from one container to another using a pipette, opening of a screw cap on a container, adding or removing a fluid from a container using a syringe, mixing a container by hand-shaking, using a cell scraper or loop to add or remove cells to or from a surface, screwing together a leur lock, mounting a tube on a barbed fitting, setting up a stand to hold a container or column, placing, locking or removing clamps from tubing, removing tubing, containers, tools etc. from autoclaved bags, opening or closing reactor vessels by screwing or opening hinges, adding a probe to a container, and other events known to a person skilled in the art. Monitoring may occur inside the clean space or outside of it.

Preferably, monitoring for one or more events is a computer-implemented step. In an embodiment, the monitoring 130 is a hands-free monitoring, using a processor 220, meaning that a user need not touch a data-entry device (e.g., a keyboard, touch display, pen and paper, etc.) in order to monitor for one or more events. Monitoring in the sterile environment may involve, for example, using a processor to control one or more of: audio monitoring, still image monitoring, video monitoring, motion monitoring (e.g., Microsoft™ Kinect™), light monitoring, gas monitoring, temperature monitoring, touch-sensitive monitoring, airflow monitoring, in-process data monitoring, scanning for pre-determined indicia, and other methods known to a person skilled in the art.

Method 100 also includes, at 140, detecting an event in the process. Detecting the event may involve, for example, identifying an audio signal corresponding with the event, identifying an image associated with the event, identifying a series or change in images associated with the event, identifying a movement corresponding with the event, identifying a light type and/or level associated with the event, identifying a gas type and/or level and/or composition associated with the event, identifying a temperature level associated with the event, identifying an output from a device (e.g., instrument) associated with the event and other methods known to a person skilled in the art.

Preferably, detection of one or more events is a computer-implemented step. In an embodiment, the detection 140 is a hand-free detection, using a sensor 210 and processor 220, meaning that a user need not touch a data-entry device (e.g., a keyboard, touch display, pen and paper, etc.) in order to detect one or more events. For example, in one embodiment, an event is detected, using a sensor, by way of receiving an audio signal corresponding with a user's voice (e.g., a microphone receiving a voice signal corresponding to a user stating an observation and/or result of a step). In one embodiment, an event is detected by way of capturing a still or video image of one or more indicia of a material(s), reagent(s), device(s) used during the process (e.g., a camera capturing an image of a label and/or an image of a distinctive shape of device). In one embodiment, an event is detected by way of capturing a motion (e.g., a gesture) corresponding to an event (e.g., a motion detection device detecting a hand/arm motion indicative of aliquoting a solution). In one embodiment, an event is detected by way of scanning for a pre-determined marker (e.g., a laser scanner detecting a barcode or an antennae detecting an RFID tag). An event may be detected by way of a processor receiving an electronic communication corresponding to data output from the sensor or a device (e.g., a processor, in a system for implementing the method provided herein, receiving data from an instrument used to carry out a step or sub-step in the process).

In some embodiments, one or more events in the process are pre-determined. For example, a catalogue of events for one or more processes may be pre-determined and stored in a data storage 230 (which may comprise an electronic database) in a system 200 for use with the method provided herein. The catalogue may be associated with one or more specific SOPs and/or eBPRs. The catalogue may include different categories of events, such as, but not limited to, audio signals, movements, product identifiers, environmental measurements, etc. One or more events may also be associated with pre-determined values or value ranges, which are set forth in the catalogue.

For example, when a user adds a reagent to a sample, the specific reagent and/or sample may be detected by one or more identifier on the reagent and/or sample container, the mass/volume of the added reagent may be detected by a user's voice command stating same, by image or video analysis using a processor, by a measurement device capable of transmitting mass/volume measurement(s) to a processor for analysis of the measurement(s), etc., and a comparison (using a processor and/or by human inspection) of the mass/volume measurement(s) with process requirements (i.e., the pre-determined expected value(s) or ranges of values, which may be stored in a database of data storage 230), may be carried out by comparing the detected volume/mass measurement(s) with the pre-determined value(s)/range of values, and the addition of the reagent to the sample may be detected by motion capture or by a balance instrument.

For example, when a user agitates a sample, the specific sample may be detected by one or more identifier on the sample container, the mechanism of agitation may be detected by motion capture (e.g., pipetting or vortexing), and the rate of agitation may be detected by, for example, a user's voice command stating the speed and duration of agitation or by a system in connection with and capable of reading or obtaining by wired or wireless electronic communication, measurements from, the agitation device, thereby providing the speed and duration of agitation to the system used to implement the detection step for analysis by a processor of the system, which may reference a data storage of the system to determine, if applicable, if the detected speed and duration conform with pre-determined requirements.

Method 100 also includes, at 150, recording in the electronic process record information associated with the detected event. Generally, information includes knowledge content that may be represented, for example, as analog or digital alphanumeric data, waves, depictions of mechanical mechanisms, drawings, images, videos, audio, etc. Information may include, for example, details of material identity, state, usage, transformation; environmental details, such as temperature, gases, sterility, light; details of results, such as quantities, qualities, categorical data, observations, equipment identification, equipment status, reference standards, time intervals and other means known to a person skilled in the art.

Preferably, recording is a computer-implemented step. Recording the detected event may involve, for example, using a processor to update the electronic process record by updating one or more data fields of the electronic process record in an electronic database of data storage 230 with audio, text, video, image, or motion data indicative of the information associated with the detected event (e.g., expected value(s) for an event).

In some preferred embodiments, the recording 150 is a hands-free recording, using a sensor 210, processor 220 and data storage 230 (which may include an electronic database), of system 200, meaning that a user need not touch a data-entry device (e.g., a keyboard, touch display, pen and paper, etc.) in order to record the information associated with the event. It will be appreciated that hands-free recording is advantageous in a clean environment, at least because touch-entry of data may not be practical in such an environment. For example, it may not be practical to keep a typical keyboard, touch display, and/or pen and paper in a BSC, at least because those instruments are not suited for sterilization, and further, may require de-gloving for effective and sterile data entry.

In some embodiments, there may be more than one user carrying out the same or a separate process in a clean space. Clean spaces are expensive to operate and the ability carry out multiple manufacturing procedures concurrently is a significant advantage in the field. The user authorization step provides identification of each of the users (e.g., two or more humans, two or more machines, or a combination of one or more humans and one or more machines) and the correct electronic process record would be provided to each user. Physical separation of reagents and each component used in the process may be monitored, for example, by RFID tags and corresponding areas that are designated for a specific workflow or cameras tracking the flow of material throughout the clean space and tying it to each user and electronic process record.

In some embodiments, the recording 150 is a real-time, or substantially real time, recording of information associated with the process. Preferably the recording is tagged with the authenticated user's identity, the time and date of the recording, and/or identification of the clean space in which the process is executed.

In some embodiments, process steps are carried out in an automated fashion based upon data collected by sensors within the system. For example, an automated pH probe measures the pH of the system in real-time and continually compares the detected pH values to the operating parameters set out in the electronic process record. When the manufacturing run falls outside of the operating parameters established for the process, the system logs the pH into the electronic process record and adjusts the pH of the system with an acid or a base to bring the batch back within the specifications. All data are logged into the electronic process record and a remote verifier (e.g., a human or a machine) may be notified when the process is modified.

Method 100 also optionally includes, at 160, verifying the recorded information.

Preferably, one or more steps of verification are computer-implemented. In an embodiment, the verification 160 is a hand-free detection, using processor 220 and a data storage 230, meaning that a user need not touch a data-entry device (e.g., a keyboard, touch display, pen and paper, etc.) in order to detect one or more events. Verifying the recorded information may involve, for example, comparing the recorded information to an expected value(s), such as pre-determined value(s) or range(s) of values for one or more of the steps of the electronic process record. This step of comparison may involve, for example, computer-implemented comparison of the recorded information to an expected value retained in a catalogue of pre-determined events housed in a data storage 230 associated with a system 200 used to implement the method provided herein. In some embodiments, the step of verifying the recorded information is carried out by a system used to implement the method provided herein, such as for example, by communication between a processor 220 and data storage 230 according to computer-executable instructions for same contained on a tangible, computer-readable storage medium communicatively coupled to the processor. In some embodiments, the step of verifying the recorded information is carried out by the authenticated user, such as, for example, by comparison of the information associated with the detected event to an expected value(s), e.g., as set forth in the electronic process record.

In some embodiments, verification 160 may further involve corroboration by an authorized verifier, such as for example, a QA manager or a machine (step not illustrated in FIG. 1).

Preferably, corroboration is a computer-implemented step. In an embodiment, the corroboration is a hand-free corroboration, using a processor 220, meaning that a user need not touch a data-entry device (e.g., a keyboard, touch display, pen and paper, etc.) in order to corroborate the verification. For example, corroboration by an authorized verifier may include notifying, using a processor and optionally a display or voice prompt, for example, the authorized verifier to corroborate one or more entries of the recorded and verified information.

In some embodiments, corroborating the verified information involves comparing the recorded information to an expected value(s) in the catalogue of pre-determined events, and/or to an expected value(s) stated in the electronic process record. If the recorded and verified information is acceptable (e.g., within a range of expected values), the authorized verifier would electronically corroborate same, e.g., by entering a signature (e.g., an electronic signature, voice command, etc.).

Notifying the authorized verifier may involve, for example, one or more of: prompting the authorized verifier to corroborate the data; alerting the authorized verifier when the recorded information differs from expected values; prompting the authorized verifier to corroborate that the recorded information is sufficient to warrant completion of a step in the process.

In some embodiments, the method further comprises detecting and recording in the electronic process record, a confirmation of the authorized verifier. Confirmation may involve, for example a signature that is specific to the authorized verifier. Detecting may involve, for example, using a processor in communication with a data storage to identify the signature and compare it to a pre-existing signature specific to the authorized verifier. Recording may involve, for example, using a processor to update the electronic process record to include the signature of the authenticated user in a pre-existing field for confirmation data.

Preferably, notification and detecting and recording a confirmation are computer-implemented steps. In some embodiments, the authorized verifier is located in the vicinity of the clean space where the process is being carried out (e.g., a floor manager). In some embodiments, the authorized verifier is located at a location distant to the clean space (e.g., in another room in the same facility as the clean space, or in a distant facility and/or location). A skilled person will appreciate that a method that involves remote verification of one or more events in a process may be advantageous, at least because it may reduce the risk of contamination and/or the cost of having an authorized verifier on-site at the clean space during the process.

In embodiments comprising verification, steps requiring verification, including by corroboration, may be pre-determined. For example, one or more steps of an electronic process record may be associated with a verification and/or corroboration flag in a database of data storage 230. The verification and corroboration flag fields in the database may be configured as Boolean data types, configurable as TRUE/ FALSE or "0"/"1", such that when processor 220 detects that the process has progressed to a step requiring verification, or verification by corroboration, progression to the next process step may not be permitted until verification has been completed. Where corroboration is required, system 200 may include or be in electronic communication with a computer or terminal (not shown) accessible only to an authorized verifier, and which is in electronic communication with processor 220. Processor 220 may transmit, over a wired or wireless network, a signal to the terminal indicating that verification of the respective process step is required, along with a copy of the information recorded in the database for the event at step 150. Alternatively, rather than transmitting the recorded information to the terminal, the terminal may be located on a secure network as part of system 200, or the terminal may be located on a secure network having a secure connection to system 200, and the terminal operator (i.e. the authorized verifier) may have access to the database, or the specific data in the database requiring verification by corroboration, over the secure connection. If the step is not verified (e.g., by entering a signature (e.g., an electronic signature, voice command, etc.), by touch input on a display panel, or keyboard entry, or selecting an on-screen icon by mouse input, etc., at the terminal computer) by the terminal operator (i.e., the authorized verifier), processor 220 may cause execution of appropriate instructions, such as instructions to prompt re-execution of the failed process step, or terminating recording of events and identifying the electronic process record as a failed electronic process record. How the processor reacts to failed verification may depend on a further database field associated with the particular event, which may indicate if the event is critical (and thus resulting in a failed electronic process record if the event fails) or capable of re-execution (which may not result in a failed electronic process record if the event fails). Alternatively, the instructions executable by the processor may dictate one particular action in response to all failed events (e.g., deeming the process a failed electronic process record), without having to make reference to a database. The method may also permit a certain number of failed attempts before identifying the electronic process record as a failed electronic process record, and the number of attempts may be a configurable field in the database.

System 200 may further include a graphical user interface or "GUI" (not shown) accessible to an authorized user to configure one or more configurable fields discussed herein, which may or may not require configuration in the database of data storage 230. For example, system 200 may include one or more XML (Extensible Markup Language) files which may include values configurable by an authorized user of the GUI and which can be read by processor 220.

Method 100 also optionally includes, at 170, storing the electronic process record. Storing may involve, for example, storing information recorded for each step or event of the electronic process record at step 150. Storing information may further include storing an indication in a database of data storage 230 that a certain step or event has completed successfully or has failed. Upon successful completion, or failure, of an electronic process record, storing may further include processor 220 causing all fields of the database containing information or data pertaining to the completed electronic process record to become non-writable, to freeze the values recorded in the database to thereby produce a frozen electronic process record. In some embodiments, a user of system 200 may cause instructions to be executed by processor 220 which cause processor 220 to export the data of the frozen electronic process record from the database to a file readable to an authorized user of system 200, or the authenticated user performing the electronic process record, such as a file having the Portable Document Format or "PDF" file format. Processor 220 may format the exported data of the frozen electronic process record so that the exported data is presented in the file in a manner more easily interpreted by a user (e.g., by adding headings). Processor 220 may also password-protect any such file comprising the exported data of the frozen electronic process record to reduce the potential for the unauthorized access to or tampering of the file.

Preferably, the method comprises generating an audit trail for all detected, recorded, confirmed and stored information, in which all changes to information are identified, by user, time, date, and clean space identification. In this way, a record of pre-change information is maintained. The change information may be included in the frozen electronic process record. In some embodiments, system 200 may also permit entry, in any manner discussed herein (such as by voice), of reasons for the change(s). The reason input may be by selection from a list of pre-determined reasons, or by free-form data entry. Any reason(s) for change(s) to the information may be recorded and stored, and may be included as part of the frozen electronic process record.

Audio input may be converted by processor 220 to text for storage in a database of data storage 230 and/or stored in an audio file format. Video and image inputs may be stored in the database in any video and image file format, respectively. Alternatively, processor 220 may create references in the database to stored files (audio, video or otherwise) that are stored in a file storage accessible to data storage 230, or which may comprise part of data storage 230 (it will be appreciated by the skilled person in the art that data storage 230 may consist of a database, or may include only as a part of the data storage, a database). Where stored data comprises information other than alphanumeric information, the file comprising the exported frozen electronic process record data may include embedded videos, audio and images (or any other type of stored information, such as any proprietary file type associated with a particular device used to input data to system 200). This stored data may be pushed to additional systems outside of the EPR for further analysis or storage. Examples of other systems which the EPR method an system could provide data to include electronic lab notebooks, laboratory information management systems, inventory management systems or to another system for data analysis, such as, for example, quality control analysis. The person skilled in the art would appreciate that the present invention is not in any way limited by the types of information stored or the file types used.

In some embodiments, the method further comprises a step (not illustrated in FIG. 1) of providing to the authenticated user an updated electronic process record. The updated electronic process record may be a revised document that includes information regarded one or more detected, recorded, and/or verified events. This step, may provide the authenticated user with real-time feedback regarding executed events in a process, such as, for example, whether data input by the authenticated user meet expected values, whether data input by an instrument in communication with system 200 for implementing the process meet expected values, and/or whether a step has been corroborated by an authorized verifier. Such real-time feedback may allow the authenticated user to continue with the process or pause to address an event that did not meet expected values. The updated electronic process record may comprise a file consisting of data exported from data storage 230 which pertains to an in-progress electronic process record, which is readable to the authenticated user of system 200 (or another authorized user of system 200) and which may be considered a "snapshot" of the progress of the electronic process record at the time it is created. Such a file may be as described above with respect to the frozen electronic process record file.

It will be appreciated that one or more of the steps of providing, monitoring, detecting, recording, verifying, corroborating, storing and authenticating can be performed within the clean space or outside of the clean space. In one embodiment, providing the electronic process record to the user occurs once the user is in the clean space.

The methods provided herein enable several workflows, such as, for example, electronic monitoring and recording of processes associated with the operation of a biotechnological or pharmaceutical manufacturing facility and for processes associated with a cell therapy product or a gene therapy product, such as cell manufacture processes, or parts thereof, as described further below in the Examples.

Computer Readable Medium

In some embodiments, the method(s) provided herein may be implemented using computer readable and executable instructions, as described above, for example. Accordingly, a second aspect provided herein is a tangible, non-transitory computer-readable medium (i.e., a medium which does not comprise only a transitory propagating signal per se) comprising the computer-executable instructions associated with the disclosed method(s), such as a local or remote hard disk or hard drive (of any type, including electromechanical magnetic disks and solid-state disks), a memory chip, including, e.g., random-access memory (RAM) and/or read-only memory (ROM), cache(s), buffer(s), flash memory, optical memory such as CD(s) and DVD(s), floppy disks, and any other form of storage medium in or on which information may be stored in a volatile or non-volatile manner, for any duration, included permanently or for brief instances. Such computer-executable instructions, if executed by a computer or machine (e.g., a processor based-system, such as a computer (not shown) housing processor 220), cause the processor, and/or the computer or machine, to perform any of the methods described herein, including those which include the steps of monitoring and recording a process. Such instructions include, but are not limited to providing an electronic process record to a display using at least one processor; monitoring, using at least one sensor, for an event associated with the electronic process record; detecting, using the at least one sensor, the event associated with the electronic process record; recording in at least one data storage, using the at least one processor, information associated with the detected event, the recorded information being associated with a record of the electronic process record in the at least one data storage; verifying, using the at least one processor in communication with the at least one data storage, the recorded information; and storing in the at least one data storage, using the at least one processor, an indication that the recorded information has been verified. Different implementations of the disclosed method(s) may involve performing some or all the steps described herein in different orders or some or all of the steps substantially in parallel. The functions or method steps may be implemented in a variety of programming languages, and such code or computer readable or executable instructions may be stored or adapted for storage in one or more machine-readable media, such as described above, which may be accessed by a processor-based system to execute the stored code or computer readable or executable instructions.

System

In a third aspect, the present description generally relates to a system for implementing the method(s) described herein, including to electronically monitor and record a process carried out in a clean space, the system having at least the following features:

one or more sensors for receiving signals associated with the process, the sensor(s) being adapted for operation in the clean space;

a display for showing one or more steps in the process, the display being adapted for operation associated with the clean space;

data storage for storing information associated with the process; and a processor for processing information associated with the process, the processor being configured to communicate with the one or more sensors, the data storage, and the display. The processor may be configured to communicate with the one or more sensors, the data storage, and the display, for example, through communication links between the processor and the remaining elements of the system, i.e., the sensor(s), data storage and display.

In an embodiment, the data storage may comprise one or more catalogues of information associated with the process. In an embodiment, the information includes, but is not limited to data associated with one or more of: user identity, user authorization, one or more process records, and one or more events.

In some embodiments, the disclosed system is suitable for one or more of the following: real-time or substantially real-time monitoring and recording of a process; hands-free monitoring and recording of a process; enforcing sequential execution of steps in a process; generating an audit trail of events and information associated with a process that has been carried out in a clean space; controlling user access to electronic process records; enforcing controlled editing of an electronic process record; complying with ALCOA principles for data storage and management; documenting changes and/or deviations to an electronic process record; integration with various instrumentation systems associated with a process and/or process analytics technology.

System 200 and method 100 may permit any or all of method steps 110 (authentication of a user), 120 (providing an authenticated user an electronic process record), 130 (monitoring for an event), 140 (detecting an event), 150 (recording information associated with a detected event), 160 (verifying recorded information), and 170 (storing an electronic process record) to be carried out in a hands-free manner and/or in real- or substantially real-time, which is expected to facilitate compliance with GMP and/or ALCOA requirements for work carried out in a clean space, while potentially reducing the number of people required and the costs associated with carrying out, recording step completions, and verifying performance of steps of an electronic process record, SOP or eBPR.

Further, system 200 may comprise redundant components, such as one or more redundant processors, data storages or databases, displays, and/or sensors. For example, system 200 may comprise two or more redundant sensors in a sensor array to help to ensure the correct capturing of events, in which case the method may include a step for cross-checking, by processor 220, the information captured by each sensor in the array of redundant sensors. Where the captured information is consistent among the sensors, it may be stored in data storage 230 (e.g., in a database thereof), and where the information captured is not consistent among the sensors, the method may further include, for example, a step prompting re-execution of the event, to re-capture the event information, or to terminate the electronic process record to thereby render the data for the electronic process record in the database non-writable, and thus frozen (as described above). Redundancy of data storage 230 and/or a database thereof is expected to help ensure the persistence of stored data and reduce the risk of data loss.

For simplicity, some embodiments of the system 200 are shown (FIG. 2) and described herein as a series of blocks. It is to be appreciated that the system is not limited by the order or arrangement of the blocks in the figures provided herein. In some embodiments, some blocks may occur in different orders or arrangements, and/or concurrently with other blocks relative to the order shown and described. In some embodiments, fewer than all the illustrated blocks may be required to generate a system suitable for implementing the disclosed method. In some embodiments, one or more blocks may be combined or separated into multiple blocks; for example, two or more of display 240, processor 220 and data storage 230 may be co-located on one machine or computer. In some embodiments, additional (non-illustrated) blocks may be added to the disclosed system. In some embodiments, one or more blocks may be repeated to generate a system suitable for implementing the method disclosed herein.

Figure 2:
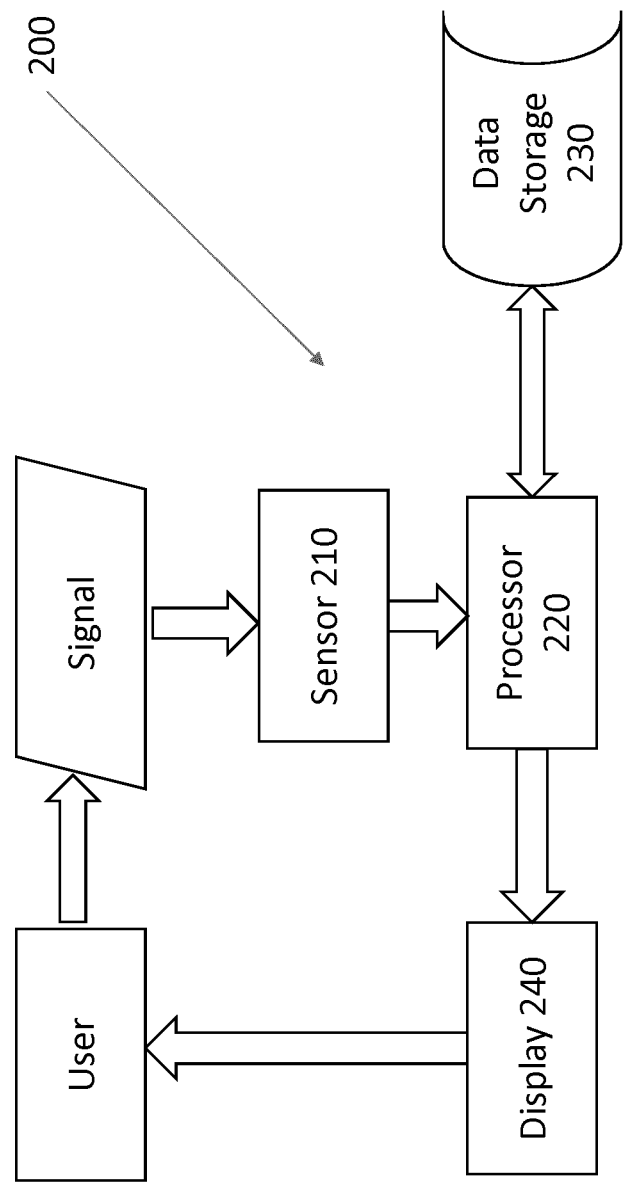
FIG. 2 depicts a flow chart illustrating one embodiment of a system provided herein.

FIG. 2 depicts one embodiment of a system 200 for electronically carrying out the method(s) described herein, such as to electronically monitor and record a process.

System 200 includes a sensor 210 for receiving one or more signals. As used herein, "sensor" refers to a single sensor or multiple sensors, including, for example, a sensor array or array of sensors. Multiple sensors may be of the same type or different types. The sensor may be, for example a photodiode, microphone, still image capture camera, video camera, motion capture device, laser barcode scanner, RFID sensor, thermometer, scale, electrochemical sensor or gas detector. In some embodiments, the sensor may be a computer processor in communication with a device and configured to receive data output signals from said device. The signals may be, for example, a type of motion, audio, biometric feature, barcode, image, electronic signal or light-based signal, microwave signal, radio wave signal, infrared signal etc. In some embodiments, the sensor receives one or more signal and translates that signal(s) into information that may be processed by a processor 220. In operation, the sensor may interface with a signal that is generated by a user (directly or indirectly) or by a device associated with the process. In operation, the sensor is in communication with a processor 220.

Preferably, the sensor 210, or at least one of multiple sensors, is adapted for operation in a clean space. The adaptations may be, for example, a sensor configuration that facilitates cleaning and/or sterilization of the sensor, or a housing for containing the sensor that facilitates cleaning and/or sterilization of the housing. As used herein, "sterilization" refers to a process of making something free of live microorganisms. Sterilization may involve, for example, chemical treatment, heat and pressure treatment (e.g., autoclaving), radiation treatment (e.g., UV light), etc. The adaptations must not interfere with operability of the sensor. For example, the adaptations must make the sensor resistant to UV radiation and/or chemicals such as hydrogen peroxide or ethanol, which may be used to sterilize the clean space. In some embodiments, the adaptions include a configuration that facilitates implementation of the sensor in a BSC in a manner that does not interfere with airflow in the BSC and/or with operations and/or other equipment housed in the BSC.

In some embodiments, the sensor(s) comprise depth perception which may be achieved, for example, by linking two sensors located a known distance apart and using triangulation to determine depth or distance. In some embodiments, the sensor(s) comprise depth perception which may be achieved, for example, by detecting the location and proximity of two indicators, such as two RFID tags in close proximity. For example, RFID tags can be positioned on the sleeves of the base gowning layer used to enter the facility and a second RFID tag can be positioned in the over-gown donned as the user proceeds into further classified spaces. The system can detect the proximity of the tags to ensure that the user was gowned sufficiently before opening the next layer of airlocks in the clean space.

System 200 also includes processor 220 for processing information associated with the process or method(s) described herein. The processor may be, for example, any computer processor known in the art capable of performing calculations and directing functions for interpreting and/or performing input, output, calculation, and display of data in accordance with the disclosed methods. Processor 220 may comprise any type of processing unit, such as typical computer processor(s), microcontroller(s), microprocessor(s), and/or programmable logic controllers (PLCs). The information to be processed by the processor may include, for example, information contained in analog or digital signals and/or translated signals and/or information contained in a data storage 230. Processing of the information may involve, for example, performing calculations on the signal such as, but not limited to, vector analysis, picture identification, pattern recognition, frequency analysis/Fourier transforms, numerical computations, machine learning, and other means known to the person skilled in the art.

In operation, the processor is in communication with one or more of the sensor(s), data storage(s), and optionally in communication with one or more of the display(s). The components of the system 200, such as sensor 210, processor 220, data storage 230, and display 240 may communicate using any electronic wired or wireless means or protocols for communication known in the art, including but not limited to Ethernet™, Bluetooth™, WiFi™, infrared, near-field communications (NFC), radio-frequency identification (RFID), WiMAX™ (fixed or mobile), cellular communications protocols such as GSM, EDGE, GPRS, CDMA, UMTS, LTE, LTE-A, IMS, and any other cellular communications protocols including, but not limited to, up to and including 5G protocols as established under the 3GPP, for example, and any other communications protocols suitable for the method(s) and system(s) described herein, including any proprietary protocols. Components of system 200 may exist on the same network or on separate networks, and the network(s) may include any type of network suitable for the system(s) and method(s) described herein, including but not limited to wired or wireless personal area networks (PANs), local area networks (LANs), mesh or ad hoc networks, wide area networks (WANs), metropolitan area networks (MANs), virtual private networks (VPNs), and any other suitable network type, as well as any suitable network configuration or topology (e.g., token ring, star, bus, mesh, tree, etc.). System 200 further includes any components necessary to effect the communication and/or network type employed, such as wireless or wired routers and access points.

Method 100 and system 200 may be implemented on a secure network to which access is limited to authorized users by any means discussed herein, including by entry of username/password combinations, biometric authentication including finger or thumb print verification, retinal scan, voice recognition, etc., key fob access, etc. The secure network may also be protected by known security measures, such as by use of firewalls. The requirement for authentication before granting access to authorized users may be implemented for any one or more of the system components, such as for access to a computer or machine (not shown) housing processor 220, access to data storage 230, access to a database of data storage 230, access to a sensor 210, access to a graphical user interface (GUI) of the system (as described above), etc. Security of method 100 and system 200 may be further provided for by encrypting communications among system components by any means or protocols known to persons skilled in the art, such as Internet Protocol Security (IPSec), Transport Layer Security (TLS), Secure Sockets Layer (SSL), etc.

In some embodiments, the system comprises more than one processor.

System 200 also includes data storage 230 for storing information associated with the process. The data storage may include, for example, various types of local or remote memory devices such as a hard disk or hard drive (of any type, including electromechanical magnetic disks and solid-state disks), a memory chip, including, e.g., random-access memory (RAM) and/or read-only memory (ROM), flash memory, optical memory such as CD(s) and DVD(s), floppy disks, and any other form of optical, physical, electronic, and/or magnetic memory devices in or on which information may be stored. Data storage 230 may comprise non-volatile memory. In some embodiments, the data storage may only be accessed via secure data transfer and traceability, which may be accomplished using one or more known server platforms. The information to be stored in the data storage may be, for example, one or more protocols, SOPs, original batch production records (i.e., master BPRs), executed and/or partially executed BPRs, one or more catalogues of events, one or more catalogues of authorized users and/or authorized verifiers, including, for example, user and/or verifier signatures and/or biometric or other authentication information for use in authenticating users for authorized access to data storage 230.

In operation, the data storage is in communication with the processor.

System 200 optionally includes display 240 for visually presenting information associated with the process to a user, for example, a human user. In some embodiments, the user is not a human, but is instead a machine, such as a robot, drone or a piece of laboratory equipment in the clean space (e.g., a conveyor belt, a water bath, a bioreactor, an incubator, a microscope or a camera). In such embodiments, the display is an optional component of system 200.

The display may be, for example, a computer monitor (e.g., LCD, (e), a CRT monitor, a projection (e.g., heads-up display (HUD) laser), etc. For example, the display may be a projection of information on one or more surfaces in the clean space, such as, for example, the interior wall of a BSC opposite a user or on the glass wall of a BSC. In some embodiments, the visual display may be, for example, situated on a mobile device, such as a tablet computer, cellular phone, smartphone, personal digital assistant (PDA), personal computer (PC), laptop computer, augmented reality display (e.g., Google™ Glass™ or Microsoft™ HoloLens™), etc. In some embodiments, where the clean space is a BSC and the visual display is situated on a mobile device, the mobile device is preferably situated outside of the BSC within a viewing vicinity of a user. In some embodiments, where the clean space is a BSC and the visual display is a projection, the projection is projected on to a wall of the BSC within a viewing vicinity of a user. The information presented on the display may be, for example, one or more steps or sub-steps in the process, prompts for information entry associated with one or more steps or sub-steps in the process, information regarding signing approval, data associated with other process records, pre-defined formulae (e.g., for calculating dilutions), confirmation that a step or sub-step in the process was recorded, verified and/or corroborated, and other information known to the person skilled in the art.

In operation, the display 240 interfaces with the user and is in communication with the processor. While FIG. 2 depicts the communication between processor 220 and display 240, and between display 240 and the user, as unidirectional, in cases where the display is capable of receiving input (such as, e.g., where the display includes a touch-screen and is capable of receiving touch input and accordingly transmitting information to processor 220), the communication between processor 220 and display 240, and between display 240 and the user, may be bidirectional.

In some embodiments, the display 240 is adapted for operation associated with a clean space. The adaptations may be, for example, a device configuration that facilitates sterilization of the display, or a housing for containing the display that facilitates sterilization of the housing. The adaptations must not interfere with operability of the display or the ability to view the display.

It will be appreciated that components of system 200, such as a computer or machine (not shown) housing processor 220, or sensor 210, include components known in the art that are required for their operation, such as a power supply, a network interface (such as a network interface card), network connectivity components (e.g., a modem, Ethernet cards, USB interface cards, FDDI cards, WLAN cards, etc.), a receiver, a transmitter, local memory, e.g. RAM, ROM, flash memory, cache or buffer memory, and/or other types of memory as previously described, a processing unit which may be in communication with input/output (I/O) devices, and all required circuitry, including bus(es). Sensor 210 may also include components specific to the sensor type. For example, for an audio sensor, sensor 210 may further comprise one or more microphones, an analog-to-digital converter, a digital-to-analog converter, a digital signal processing unit, an anti-aliasing filter, a band pass filter, and/or other components which would be known to the skilled person in the art. A computer or machine (not shown) housing processor 220 may also include, for example, memory (e.g., hard disk storage, RAM, ROM, flash memory, cache or buffer memory, and/or other types of memory as previously described), attached input device(s) (e.g., a mouse, keyboard, microphone, etc.), attached output device(s) (e.g., a display monitor), and local memory for processor 220 (e.g., registers, cached RAM, such as L1 cache, L2 cache, etc.). Depending on the system component, other components may also be present (e.g., an image or video capturing sensor may include a camera, a device in communication with a cellular network may include an antenna, etc., and it will be appreciated that such components would be known to the skilled person).

Some Advantages Relative to Existing Methods and Systems

In some embodiments, the method and/or system provided herein may have one or more compliance and/or documentation advantages relative to paper BPRs and/or existing eBPRs.

For example, in some embodiments the method and/or system provided herein is expected to be improved relative to a paper BPR with respect to one or more of the following: legibility; contemporaneousness; originality; accuracy; compliance with CFR 21 Part 11; ease of securing documents; and document retention.

For example, in some embodiments the method and/or system provided herein is expected to be improved relative to existing eBPRs with respect to one or more of the following features: contemporaneousness and/or originality (e.g., at least because existing eBPRs may require a second person to record data generated by a first person operating in a clean space, and method 100, and system 200, may facilitate real-time or substantially real-time execution of one or more steps of method 100, e.g., monitoring and recording of events); accuracy (e.g., at least due to automated monitoring, detecting, recording and/or verification of one or more events in the process, and in some embodiments, redundancy and crossing-checking of data input to sensors); and ease of securing documents (e.g., automated securing of documents facilitated by a processor in communication with a data storage, as set forth in some embodiments of the system provided herein).

In some embodiments, the method and/or system provided herein may have one or more business advantages relative to paper BPRs and/or existing eBPRs.

For example, in some embodiments the method and/or system provided herein is expected to be improved relative to a paper BPR with respect to one or more of the following features that are relevant to business goals and/or requirements: trendability (e.g., analysis of the process underway as it may relate to data or meta-data regarding the same or other processes); headcount efficiency (e.g., by eliminating the need for a second person to enter data into the process record); process capability analysis enablement (e.g., data processing of current process record relative to other process records using statistical software); real-time entry of data and release of BPRs; systems integration; and gowning costs (e.g., by eliminating the need for a second person to enter data into the process record and repeated re-gloving or re-gowning). In some embodiments, the method and/or system provided herein is expected to be advantageous by removing the need for a second person being present in a clean space to verify process steps have been carried out per requirements by either removing that verifier entirely or by enabling the verifier to remotely verify process steps from outside the clean space.

In some embodiments the method and/or system provided herein is expected to be improved relative to existing eBPRs with respect to one or more of the following features that are relevant to business goals and/or requirements: headcount efficiency; and gowning costs.

In some embodiments, the method and/or system provided herein may have one or more advantages with respect to cell manufacturing processes relative to paper BPRs and/or existing eBPRs.

For example, in some embodiments the method and/or system provided herein is expected to be improved relative to a paper BPR with respect to one or more of the following features that are relevant to cell manufacturing: product contamination risk (e.g., reducing risk by eliminating the need to manually enter data into the BPR); introducing particles to facility (e.g., reducing particle introduction by eliminating paper from the clean space and/or the need to exit and enter the BSC additional times to manually enter data into the BPR); number of times entering/exiting a BSC (which is expected to be reduced); reagent tracking (e.g., improved by automated monitoring, detecting, recording and verifying and/or by communication between the system processor and a device associated with the process); and equipment tracking (e.g., improved by automated monitoring, detecting, recording and verifying and/or by communication between the system processor and a piece of equipment associated with the process).

In some embodiments the method and/or system provided herein is expected to be improved relative to existing eBPRs with respect to one or more of the following features that are relevant to cell manufacturing: product contamination risk; introducing particles to facility and number of time entering/exiting a BSC.

In some embodiments, the method and/or system provided herein is expected to be improved relative to existing eBPRs, at least because it provides a user with real-time or substantially real-time feedback regarding executed events in a process, such as, for example, whether data input by the user meet expected values, whether data input by an instrument in communication with a system for implementing the process meet expected values, and/or whether a step has been corroborated by an authorized verifier. Such real-time or substantially real-time feedback may allow the authenticated user to continue with the process or pause to address an event that did not meet expected values.

EXAMPLES

Example 1: Referring now to the Table 1 below, which depicts one embodiment of the method provided herein and one embodiment of a system for implementation of the method provided herein, one step in a GMP-regulated cell manufacturing batch process is to be carried out in a BSC (Table 1, left column). The step is directed to adding a pre-determined volume of a specific growth factor to a culture of cells that had been seeded 48 hours earlier. The step is one step in a protocol that is set forth in a batch production record. In the method of Example 1, a plurality of events must be verified, by one or more of an authenticated user, an authorized verifier, and/or a system for implementation of the method provided herein. The events that require verification are set forth in the column second from the left in Table 1. Method steps or blocks and system blocks required to verify each of the events in the protocol step are set forth in the table in the column second from the right and the right-most column, respectively.

TABLE 1

| SOP Method Step | Verification of events | Method blocks | System blocks |
|---|---|---|---|
| I. Add 0.5 ml of growth factor I to a T75 flask | 1. Verify the operator has the appropriate training and is | 110 | 210, 220, 230, optionally 240 |

TABLE 1-continued

| SOP Method Step | Verification of events | Method blocks | System blocks |
|---|---|---|---|
| 48 h after seeding. Pipette up and down five times to mix. | scheduled to run the SOP; 2. Release the appropriate in-process BPR | 120 | 220, 230, 240 |
| | 3. Verify the flask is the correct flask (e.g., a barcode or RFID tag) | 130, 140, 150, 160 | 210, 220, 230, optionally 240 |
| | 4. Verify current time is 48 h post-seeding | 130, 140, 150, 160 | 220, 230, optionally 240 |
| | 5. Verify Growth Factor I status | | |
| | passed receipt specification | 130, 140, 150, 160 | 210, 220, 230, optionally 240 |
| | concentration of GF1 is correct | 130, 140, 150, 160 | 210, 220, 230, optionally 240 |
| | lot number, proper storage and cold chain | 130, 140, 150, 160 | 210, 220, 230, optionally 240 |
| | 6. Verify all materials required for the step are assembled (camera, barcodes reference back to parts list) | 130, 140, 150, 160 | 210, 220, 230, optionally 240 |
| | 7. Verify pipette - in calibration and correct size - barcode or RFID | 130, 140, 150, 160 | 210, 220, 230, optionally 240 |
| | 8. Verify pipette set to the correct volume - camera or digital pipette | 130, 140, 150, 160 | 210, 220, 230, optionally 240 |
| | 9. Verify that the GF1 is completely thawed and vortexed for resuspension - camera | 130, 140, 150, 160 | 210, 220, 230, optionally 240 |
| | 10. Visual inspection of volume in pipette - camera | 130, 140, 150, 160 | 210, 220, 230, optionally 240 |
| | 11. Visual monitoring of addition to the flask | 130, 140, 150, 160 | 210, 220, 230, optionally 240 |
| | 12. Visual inspection of pipette tip after addition | 130, 140, 150, 160 | 210, 220, 230, optionally 240 |
| | 13. Verify addition based on information corroborated in steps 10-12 | 130, 140, 150, 160 | 210, 220, 230, optionally 240 |
| II. Ensure flask is closed; swirl closed flask gently | 1. Close flask - camera | 130, 140, 150, 160 | 210, 220, 230, optionally 240 |
| | 2. Verify alignment with marks on cap to ensure complete closure - camera | 130, 140, 150, 160 | 210, 220, 230, optionally 240 |
| | 3. Swirl gently (e.g., show on display pre-determined video of how to swirl gently to ensure done correctly); video capture of the swirl and compare detected swirl to video. | 130, 140, 150, 160 | 210, 220, 230, 240 |
| III. Return to the incubator for 4 h | 1. Verify incubator is correct | | |
| | correct incubator | 130, 140, 150, 160 | 210, 220, 230, optionally 240 |
| | temperature, CO2 correct | 130, 140, 150, 160 | 210, 220, 230, optionally 240 |
| | in calibration | 130, 140, 150, 160 | 210, 220, 230, optionally 240 |
| | cleaning protocol followed | 130, 140, 150, 160 | 210, 220, 230, optionally 240 |
| | 2. Place in incubator | 130, 140, 150, 160 | 210, 220, 230, optionally 240 |
| | 3. Verify location and incubator closure | 130, 140, 150, 160 | 210, 220, 230, optionally 240 |
| | 4. Set 4 h timer | 130, 140, 150, 160 | 210, 220, 230, optionally 240 |
| | 5. Lock batch record | 170 | 230, optionally 240 |

Figure 3:
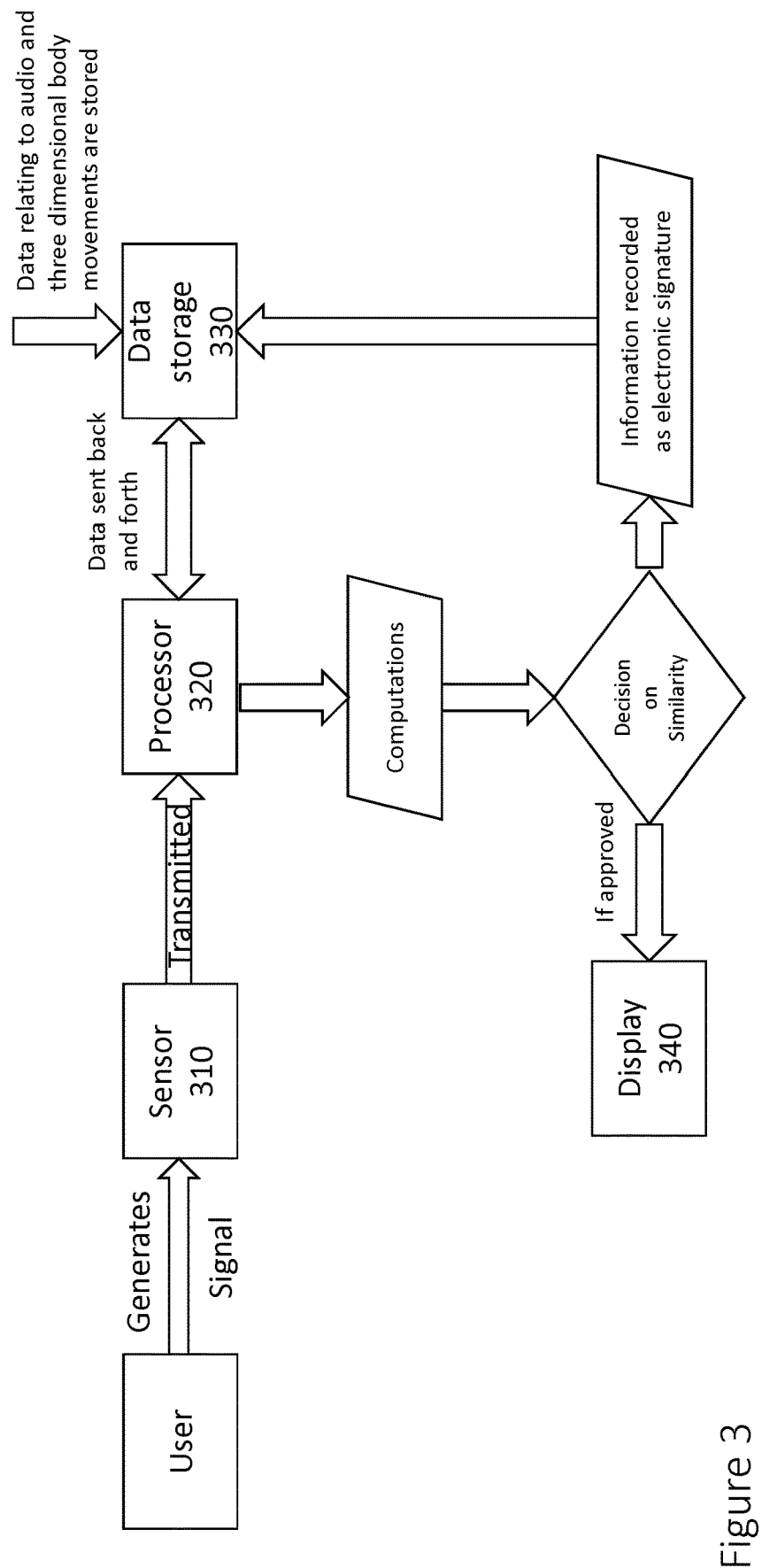
FIG. 3 depicts a flow chart illustrating one embodiment of a system in operation with a user, as provided herein.

Example 2: Referring now to FIG. 3, which illustrates one embodiment of a method and system provided herein, an authorized user carrying out a step in a process while operating in a BSC. The authorized user generates an audio signal (e.g., voice command or clapping) to indicate completion of a step in the process, as provided to the user on the display 340. The audio signal is received by one or a plurality of microphone sensor(s) 310 and converted into a signal that is usable by a computer process. The converted signal is transmitted to a computer processor 320 which processes the information in the transmitted signal and compares the processed information to a data storage 330 containing a catalogue of pre-determined audio commands associated with the process. The processor 320 determines whether the signal matches a pre-determined signal in the catalogue in the data storage 330 by way of one or more computational algorithms which may employ thresholds for determining whether a received signal is of sufficient overlap to the pre-determined reference signal in the data storage 330 for the received signal to be considered a match. If the signal matches a pre-determined signal (or is substantially similar to a pre-determined signal/event), then the processor 320 records the event in the electronic process record. The processor 320 then determines whether the recorded signal corresponds with an expected value(s) for the pre-determined event in the catalogue in the data storage 330 by way of one or more computational algorithms. If the recorded signal corresponds with an expected value for a pre-determined event and with a pre-determined step or sub-step in the electronic process record, then the processor 320 verifies the event in the electronic process record. The processor 320 then provides to the display 340 an updated electronic process record, confirming that the step has been completed as described by the electronic process record.

In another embodiment, not shown, if the recorded signal does not correspond with an expected value for a pre-determined event in an electronic process record, then the processor will not verify the event in the electronic process record. The processor may then provide to the display an updated electronic process record, indicating that the step has not been completed as described by the electronic process record, due to a deviation from an expected value(s) for an event. Further actions that may be taken by the processor in such a scenario are described above.

Figure 4:
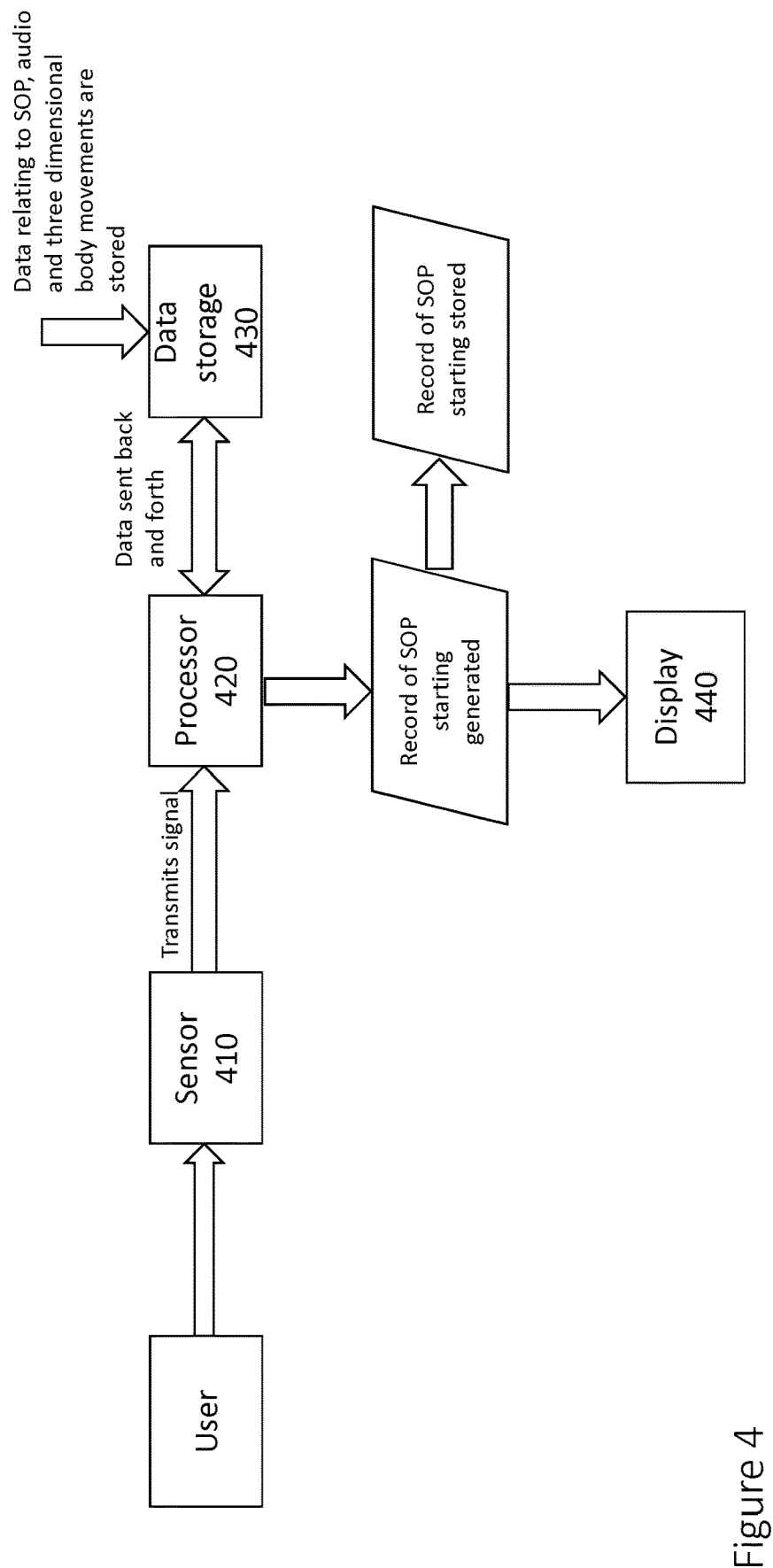
FIG. 4 depicts a flow chart illustrating one embodiment of a system in operation with a user, as provided herein.

Example 3: Referring now to FIG. 4, which illustrates one embodiment of steps in a method provided herein as implemented by one embodiment of a system provided herein. A user intends to begin work in a BSC. The user approaches the BSC and provides a unique identifier (e.g., by stating his/her name and/or password). A sensor 410 associated with the BSC detects the voice signal, translates it into a format usable by a computer processer and sends the translated signal to the processor 420. The processor 420 processes the signal and, in communication with a data storage 430, confirms i) who the user is; ii) whether the user is authorized to carry out a process in the BSC on the given date and time, thereby authenticating the user; iii) which SOP the user is authorized to carry out on the given data and time; iv) generating an electronic process record with the authenticated user's identity and the current date and time stamp; and v) providing to the user via a display 440 the generated electronic process record.

In other embodiments, the signal could be an electronic signature or one or more signals corresponding to a type of biometric information.

Figure 5:
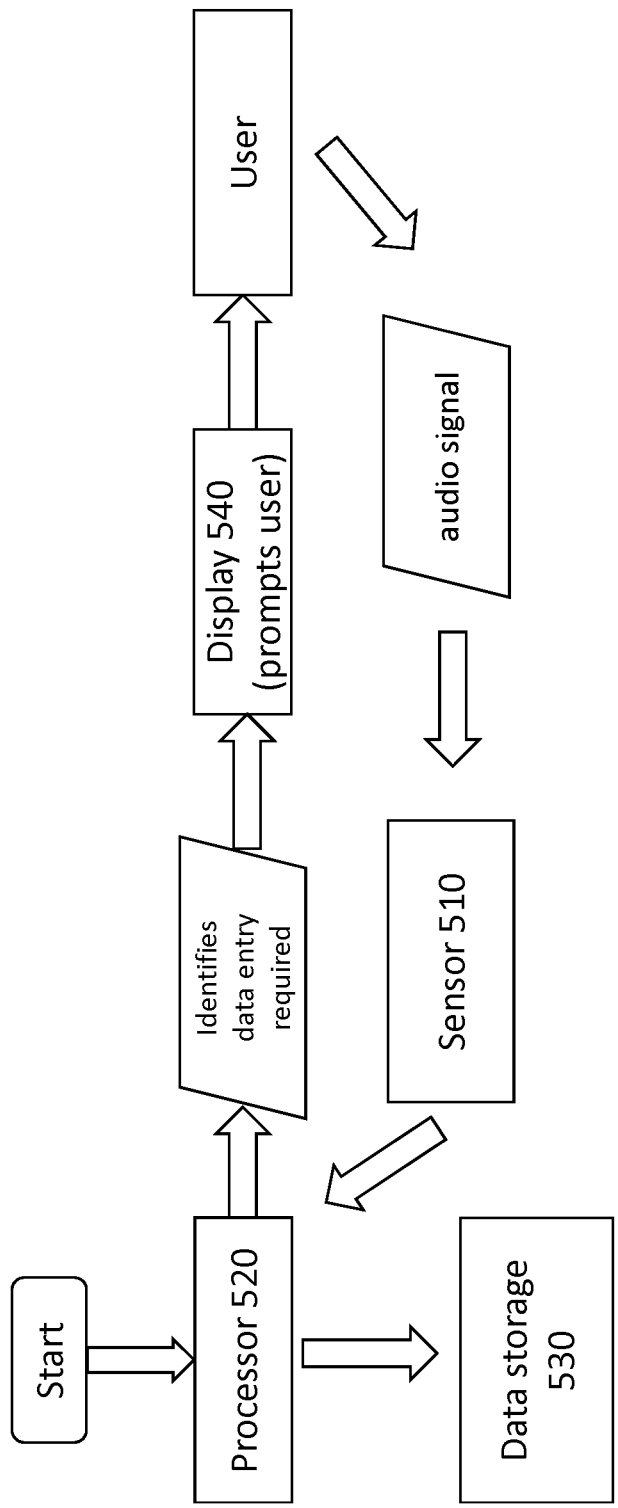
FIG. 5 depicts a flow chart illustrating one embodiment of a system in operation with a user, as provided herein.

Example 4: Referring now to FIG. 5, which illustrates one embodiment of steps in a method provided herein as implemented by one embodiment of a system provided herein, a user is following an eBPR step that requires data entry. A processor 520 sends information to the display 540 comprising a prompt for the user to enter required information associated with an event in the process. The user generates an audio signal containing the relevant information, which is received by a sensor 510, translated or transformed into a format suitable for processing by the processor 520 (e.g., digitization of the analog voice signal by a modem), and provided to the processor 520. The processor 520 then processes the information (which may include analyzing the audio information to determine its contents), and stores the data from the audio signal (and/or a reference to the audio file stored in data storage 530) in a data storage 530. In another embodiment, the processor may also perform mathematical calculations. The processor 520 then sends information to the display 540 to prompt the user to verify the detected event.

Figure 6:
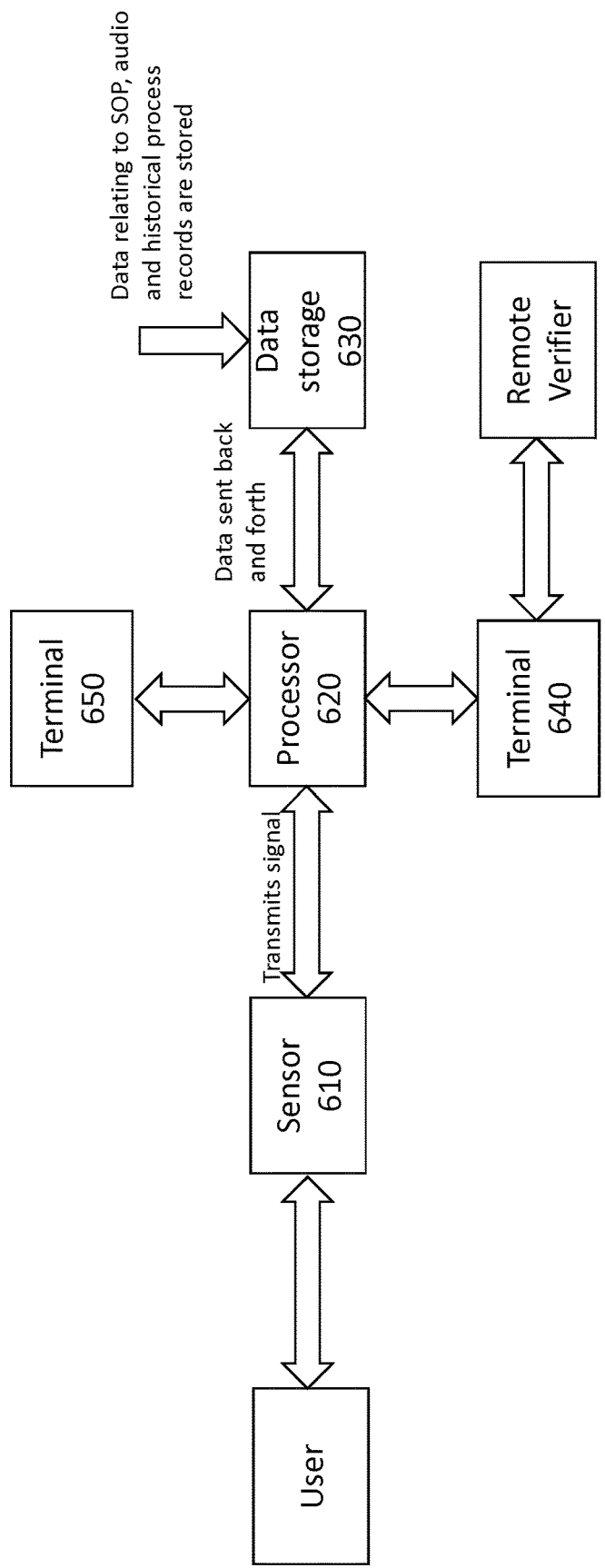
FIG. 6 depicts a flow chart illustrating one embodiment of a system in operation with a user, as provided herein.

Example 5: Referring now to FIG. 6, which illustrates one embodiment of a method and system provided herein, an authorized user and a remote user verifying a step in a process. The authorized user begins a step in an electronic process record that requires verification by a second user (e.g., a recipient receiving information regarding that step) and requests remote verification by generating an audio signal (e.g., voice command) requesting remote verification. The audio signal is received by one or a plurality of microphone sensor(s) (610) and is converted into a signal that is usable by a computer process. The converted signal is transmitted to a computer processor 620 which then identifies an available recipient (e.g., the remote verifier) that meets the training requirements for the step via data storage 630. Processor 620 contacts a recipient/remote verifier via an electronic terminal 640 (e.g. a computer, tablet, or smartphone) to request verification of the step in the process. The recipient/remote verifier acknowledges the request and starts the verification process via an interaction with the terminal 640 (e.g. a password, voice command, fingerprint, facial or other biometric confirmation of identity of the recipient/verifier). The processor 620 begins the remote verification step by activating the required sensors for the verification step which may include microphones, photographic cameras, video cameras, thermal cameras or analytic equipment. The user carries out the process displayed in the eBPR and data from the sensors are recorded by processor 620 to the database and transmits the process data to the recipient/remote verifier terminal 640. The recipient/remote verifier may communicate directly with the user via audio or visual sensors during the process to ensure that the process is carried out correctly and is observable to the recipient/verifier.

Once the process is complete the user signs off the step as complete via a voice command or other input which is transmitted via processor 620. If the step was carried out according to the electronic process record the recipient/remote verifier provides confirmation of the process step by interacting with the terminal 640 and the step is logged by processor 620 to the electronic process record, which released the next step in the process. If the next step of the process requires remote verification, then the recipient/remote verifier may remain connected to the user via terminal 640 and processor 620 for additional verification. If the next step does not require remote verification, then processor 620 will terminate the connection with terminal 640 and the remote recipient/verifier can now review additional processes.

In another embodiment, shown in FIG. 6, if the process step does not meet the specification detailed in the electronic process record then the user and/or the recipient/verifier are notified and the recipient/verifier can initiate the required process, here called a process investigation, for failure of a step via terminal 640. Processor 620 receives the signal for the process investigation and queries data storage 630 for previous process failures at this step of the electronic process record. Data included in this query could include for example frequency of errors or failures at this step for previous batches, effects of previous errors on batch release, results from previous investigations on how to rework the process failure or other real-time analytics that could influence decisions of the recipient/verifier on the risk of the process failure. Data storage 630 may be queried for a preferred rework of the process failure and the corrective action (e.g., in the form of a corrective electronic process record) is provided to the user via processor 620 without review by the recipient/verifier or other human intervention. Alternatively, these data are transmitted via processor 620 to terminal 640 for review by the recipient/remote verifier. The recipient/remote verifier determines, based on information displayed at terminal 640 and by communicating with the user via processor 620, how to resolve the process error or deviation. Examples of the resolution could include using terminal 640 to log the process investigation to the electronic process record via processor 620 and storing the information in data storage 630 or notifying a supervisor or quality personnel at terminal 650 to initiate a formal process investigation if the error is critical according to historical information or identified critical steps in the electronic process record from storage 630. Decisions from the investigation are transmitted from terminal 650 to processor 620, which transmits information to the user and terminal 640 to notify the remote recipient/verifier and stores the data in data storage 630. The recipient/remote verifier may initiate provision of a corrective electronic process record to the user. If the issue is communicated as resolved, then the processor 620 retrieves the next step of the electronic process document from database 630 and transmits the information to the user.

In another embodiment, not shown, the user is replaced by direct monitoring of a process by an integrated sensor such as a glucose sensor, oxygen sensor, pH sensor, lactate sensor, cell density sensor, cell viability sensor, or other real time process sensor. At a predetermined time the integrated sensor transmits data to the processor which is stored into the data storage system and transmitted to a remote verifier to confirm that the process is within the parameters associated with the electronic process record.

In another embodiment, not shown, the user is a liquid handling robotic system. The liquid handling robot is notified by the system that a sample of the cells growing in a bioreactor needs to be taken. The system authorizes the robot to take the sample after ensuring that the liquid handling robot is within desired specifications and contains the reagents required to carry out the sampling. The system identifies a remote verifier to observe the process and the remote verifier confirms that the liquid handling robot can sample the system. Once the liquid handling robot takes the sample it is then labeled and logged into the system and provided to an authorized quality control technician to carry out designated tests outside the clean space.

Figure 7:
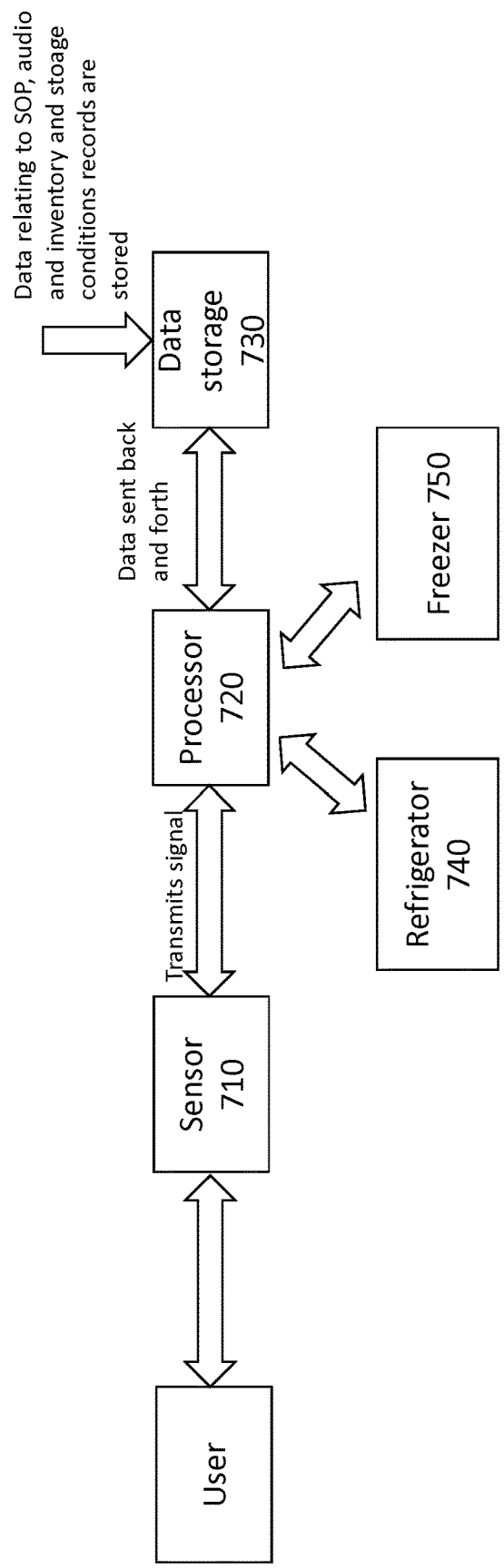
FIG. 7 depicts a flow chart illustrating one embodiment of a system in operation with a user, as provided herein.

Example 6: Referring now to FIG. 7, which illustrates one embodiment of a method and system provided herein, an authorized user thaws material to make an in process formulation such as a media. The user initiates the electronic process record and begins the first step of the process by interacting via voice command with a sensor suite (710) in the clean space which may contain one or a plurality of a microphone, video camera, photographic camera, thermal camera, temperature sensor, mass sensor, as well as a display and a speaker. The audio signal is converted into a signal usable by a computer process and transmitted via a computer processor 720. The processor accesses the electronic process record from data storage 730 and identifies the required components for the media formulation. The processor then determines via a computational algorithm whether the required materials are present in the inventory catalog in data storage 730. The processor then determines via a computational algorithm which lots of material in inventory should be used to complete the step in the electronic process record and processor queries contents of the RFID-enabled refrigerator 740 and RFID enabled freezer 750 to determine the location of the material. Processor 720 transmits the information to the user via the sensor suite 710, including the location of the proper reagents. The user or an automated delivery system such as a drone, convey belt or robot collects the required materials from 740 and 750 and logs them into the electronic process record via an input device that may include an RFID scanner, barcode reader, or voice command. The processor stores the information from the user in data storage 730. The sensor suite 710 provides continual measurement of the environment and the temperature of the materials (e.g. thermal camera and temperature sensing containers) and transmits that information to the processor 720. The processor 720 monitors the temperature of the materials and using a computer algorithm continually assesses the integrity of the materials. If the processor 720 determines that a reagent may soon be compromised, the processor 720 transmits a signal to the sensor suite 710 to alert the user that the reagents may soon be compromised and action should be taken. For example, if a material was not a homogenous temperature above the melting point of the material as detected by a thermal imaging camera, then the processor 720 would notify the user that the material is not ready for use. Once the process step is complete and the user signs off on completion via voice using the sensor suite 710 and the signal is transmitted to the processor 720, the processor 720 verifies that all tracked materials were maintained in appropriate conditions according to a computer algorithm. These data are then transmitted to data storage 730 and added to the electronic process record.

Example 7: Referring now to FIG. 8, which illustrates one embodiment of a manufacturing workflow of a generic patient specific T-cell therapy. A manufacturing run is scheduled based on receipt of donor patient sample (e.g. apheresis unit), which may arrive fresh or frozen. The remaining starting materials are stocked in inventory, and are released to the batch based on a Bill of Materials (BOM) describing the specific quantities and lot numbers to be released for the particular manufacturing batch. The material can be released by a human or by a robot or a drone. As the materials enter the manufacturing space, sensors identify each individual material entering the material pass-through and verify the item against the BOM. A visual display (e.g. monitor) confirms that all items entering the manufacturing space are designated to the batch record. The eBPR is updated automatically. The system is also able to identify that the assigned operator is present, and that all requisite training is up to date. In this embodiment, the system is privy to room equipment status to ensure there are no overdue maintenance or calibrations, or that there are any real-time operating deviations. Once all requisite conditions are met, a visual display confirms to the operator that they may begin production.

The operator is provided with visually accessible instruction for their current step, and can interact in a hands-free manner to confirm step completion and to enter step results. In this embodiment, this is performed by voice input, with visual confirmation on an accessible display. Alternatively, where a material lot number is to be recorded for a particular step, this can be entered to the eBPR by a scan or by proximity sensor. Moreover, where the process is being performed by networked equipment, the equipment itself can record process values directly to the eBPR. Where a second verifier is required, the system will prompt the second verifier for confirmation. This second verifier can be remote and interact via camera, or can be present in the manufacturing suite. It is common that step details are informed by preceding step results, and in this embodiment, any calculations are performed automatically and step instructions to the operator are seamlessly adjusted and displayed. Alternatively, the process flow diagram may contain branching or optional steps. The eBPR in this embodiment will only show the operator the current process flow path.

Once the manufacturing process is complete, the product and associated quality control samples are tagged. The product is stored and the tag is able to interact with sensors in quarantine to log storage location. QC samples are similarly tagged and as testing is completed the eBPR is updated. Once the eBPR is complete, the product is reviewed and released. eBPR data is available for facile analytical interrogation to understand trends in process performance measures.

Example 8: The user in the clean space takes a measurement that is entered into the electronic process record. The next step in the electronic process record is dependent upon the in-process measurement that was taken. For example, a user measures the concentration of cells in a cell culture media using an automated cell counting system. The remote verifier confirms that the value from the cell count was entered into the electronic process record correctly. The processor then takes the value entered into the electronic process record and calculates the volume of media to add in the next step of the process. This value is then communicated to the user in the clean space via a display and the manufacture of the batch proceeds.

It will be appreciated that any module, component, or system exemplified herein that executes instructions or operations may be implemented using one or more processor devices, although not necessarily shown. It will be appreciated that any module, component, or system exemplified herein that executes instructions or operations may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, and the information stored thereon may include computer readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any application, system or module herein described may be implemented using computer readable/executable instructions or operations that may be stored or otherwise held by such computer readable media.

Although the invention has been described with reference to certain specific embodiments, various modifications thereof will be apparent to those skilled in the art without departing from the purpose and scope of the invention as outlined in the claims appended hereto. Any examples provided herein are included solely for the purpose of illustrating the invention and are not intended to limit the invention in any way. Any drawings provided herein are solely for the purpose of illustrating various aspects of the invention and are not intended to be drawn to scale or to limit the invention in any way. The disclosures of all prior art recited herein are incorporated herein by reference as if set forth in their entirety.

We claim:

1. A computer-implemented method for monitoring and recording a process in a clean space, the method comprising:
   providing an electronic process record to a user using at least one processor, wherein the user is a human;
   monitoring, using at least one sensor comprising a microphone, for an event associated with the electronic process record, wherein the event is an audio signal generated by the user in the clean space;
   detecting, using at least one sensor, the event associated with the electronic process record; and
   recording, in at least one data storage, using the at least one processor, in the electronic process record, information associated with the detected event, the recorded information being associated with a record of the electronic process record in the at least one data storage and determined based on the audio signal;
   verifying, using the at least one processor in communication with the at least one data storage, the recorded information; and
   storing, using the at least one processor in communication with the at least one data storage, an indication that the recorded information has been verified.

2. The computer-implemented method of claim 1, further comprising:
   corroborating the verified recorded information.

3. The computer-implemented method of claim 1, further comprising authenticating the user of the clean space, using the at least one sensor in communication with the at least one processor in communication with the at least one data storage, wherein the authenticating occurs prior to providing the electronic process record.

4. The computer-implemented method of claim 1, wherein the electronic process record is provided to the human user via a display.

5. The computer-implemented method of claim 1, wherein the verifying occurs outside the clean space.

6. The computer-implemented method of claim 1, wherein when the recorded information associated with the electronic process record is outside a specification set out in the electronic process record the user or a recipient is notified and, optionally, the user is provided with a corrective action for implementing process controls to correct the event with or without user or recipient intervention.

7. The method of claim 1, wherein the recording is a real-time or substantially real-time recording.

8. A system for electronically monitoring and recording a process in a clean space, the system comprising:
   a sensor comprising a microphone for detecting an event associated with an electronic process record, wherein the event is an audio signal generated by a user in the clean space and the user is a human;
   a data storage comprising one or more catalogues of information associated with the process, wherein the information associated with the process comprises the electronic process record;
   a processor, the processor in communication with the sensor, and the data storage, wherein the processor is configured to:
   provide the electronic process record to the user;
   monitor, using the sensor, for the event associated with the electronic process record;

detect, using the sensor, the event associated with the electronic process record;

record, in the data storage, information associated with the detected event, the recorded information being associated with a record of the electronic process record in the at least one data storage and determined based on the audio signal;

verify the recorded information; and store an indication that the recorded information has been verified.

9. The system of claim 8, wherein the information comprises data associated with one or more of: user identity, user authorization, and one or more events.

10. The system of claim 8, further comprising a display for operation associated with the clean space, wherein the display is positioned at a location that is outside the clean space and viewable by the user or the display is for operation in the clean space.

11. The system of claim 8, further comprising one or more devices for implementation of one or more process controls.

12. The system of claim 8, wherein the processor processes information associated with an event in the process that is outside a specification set out in the electronic process record and notifies a user or recipient; and, wherein the recipient is positioned inside or outside the clean space.

13. A non-transitory computer-readable storage medium storing instructions for monitoring and recording a process in a clean space, the instructions comprising:

providing an electronic process record to a user using at least one processor, wherein the user is a human;

monitoring, using at least one sensor comprising a microphone, for an event associated with the electronic process record, wherein the event is an audio signal generated by the user in the clean space;

detecting, using the at least one sensor, the event associated with the electronic process record; and recording in at least one data storage, using the at least one processor, information associated with the detected event, the recorded information being associated with a record of the electronic process record in the at least one data storage and determined based on the audio signal;

verifying, using the at least one processor in communication with the at least one data storage, the recorded information; and storing in the at least one data storage, using the at least one processor, an indication that the recorded information has been verified.

14. The non-transitory computer-readable storage medium of claim 13, wherein the instructions further comprise:

corroborating the verified recorded information.

15. The non-transitory computer-readable storage medium of claim 13, wherein the instructions further comprise authenticating the user of the clean space, using the at least one sensor in communication with the at least one processor in communication with the at least one data storage, wherein the authenticating occurs prior to providing the electronic process record to the display.

16. The non-transitory computer-readable storage medium of claim 13, wherein the electronic process record is provided to the user via a display and, optionally, wherein the display is for operation associated with the clean space.

17. The non-transitory computer-readable storage medium of claim 13, wherein the instructions further comprise notifying the user or a recipient when the recorded information associated with the electronic process record is outside a specification set out in the electronic process record.

18. The non-transitory computer-readable storage medium of claim 17, wherein the instructions further comprise providing the user with a corrective action for implementing process controls to correct the event with or without user or recipient intervention.

\* \* \* \* \*